(12) United States Patent
Deering et al.

(10) Patent No.: US 6,496,187 B1
(45) Date of Patent: Dec. 17, 2002

(54) GRAPHICS SYSTEM CONFIGURED TO PERFORM PARALLEL SAMPLE TO PIXEL CALCULATION

(75) Inventors: Michael F. Deering, Los Altos, CA (US); Nathaniel David Naegle, Pleasanton, CA (US); Scott R. Nelson, Pleasanton, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/472,940

(22) Filed: Dec. 27, 1999

Related U.S. Application Data

(63) Continuation-in-part of application No. 09/251,844, filed on Feb. 17, 1999.
(60) Provisional application No. 60/074,836, filed on Feb. 17, 1998.

(51) Int. Cl.[7] .............................................. G06T 15/00
(52) U.S. Cl. ........................................ 345/419; 345/611
(58) Field of Search ............................. 345/419, 420, 345/426, 427, 428, 581, 589, 611, 629, 612, 613, 614, 615, 473

(56) References Cited

U.S. PATENT DOCUMENTS

| | | | |
|---|---|---|---|
| 5,117,289 A | | 5/1992 | Farley et al. |
| 5,287,438 A | * | 2/1994 | Kelleher ..................... 345/613 |
| 5,481,669 A | * | 1/1996 | Poulton et al. ............. 345/505 |
| 5,619,438 A | | 4/1997 | Farley et al. |
| 5,742,277 A | * | 4/1998 | Gossett et al. .............. 345/611 |
| 5,745,125 A | * | 4/1998 | Deering et al. ............. 345/426 |
| 5,999,187 A | * | 12/1999 | Dehmlow et al. .......... 345/420 |
| 6,072,498 A | * | 6/2000 | Brittain et al. .............. 345/428 |
| 6,204,859 B1 | * | 3/2001 | Jouppi et al. ............... 345/422 |
| 6,313,838 B1 | * | 11/2001 | Deering ...................... 345/420 |

FOREIGN PATENT DOCUMENTS

| | | |
|---|---|---|
| EP | 0 463 700 | 1/1992 |
| GB | 2 278 524 | 11/1994 |
| WO | 91/14995 | 10/1991 |

OTHER PUBLICATIONS

International Search Report for Application No. PCT/US 00/04148, mailed May 29, 2000.
Hadfield et al., "Achieving Real–Time Visual Simulation Using PC Graphics Technology," presented at I/ITSEC Nov. 1999.
Bjernfalk, "Introducing REALimage™ 4000 and HYPERpixel™ Architecture," © 1999 Evans & Sutherland Computer Corporation, pp. 1–9.
Bjernfalk, "The Memory System Makes the Difference," © 1999 Evans & Sutherland Computer Corporation, pp. 1–11.

* cited by examiner

Primary Examiner—Mark Zimmerman
Assistant Examiner—Enrique L Santiago
(74) Attorney, Agent, or Firm—Jeffrey C. Hood

(57) ABSTRACT

A graphics system that is configured to utilize a sample buffer and a plurality of parallel sample-to-pixel calculation units, wherein the sample-pixel calculation units are configured to access different portions of the sample buffer in parallel. The graphics system may include a graphics processor, a sample buffer, and a plurality of sample-to-pixel calculation units. The graphics processor is configured to receive a set of three-dimensional graphics data and render a plurality of samples based on the graphics data. The sample buffer is configured to store the plurality of samples for the sample-to-pixel calculation units, which are configured to receive and filter samples from the sample buffer to create output pixels. Each of the sample-to-pixel calculation units are configured to generate pixels corresponding to a different region of the image. The region may be a vertical or horizontal stripe of the image, or a rectangular portion of the image. Each region may overlap the other regions of the image to prevent visual aberrations.

52 Claims, 25 Drawing Sheets

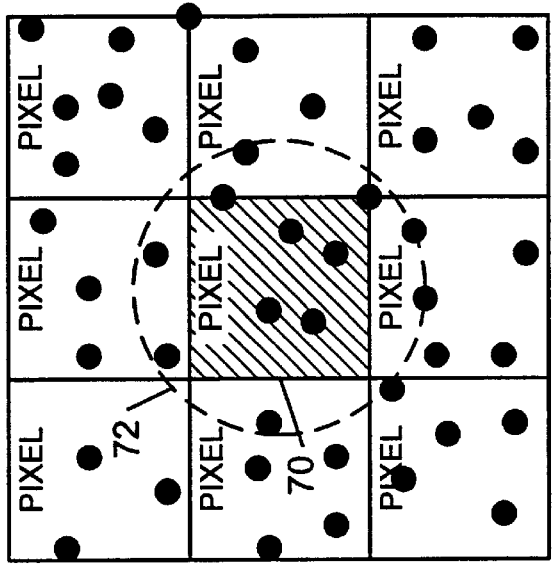
FIG. 5B
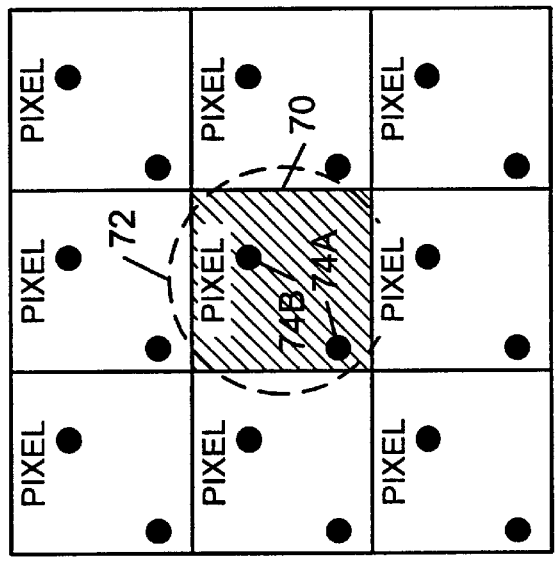
FIG. 4
FIG. 5A

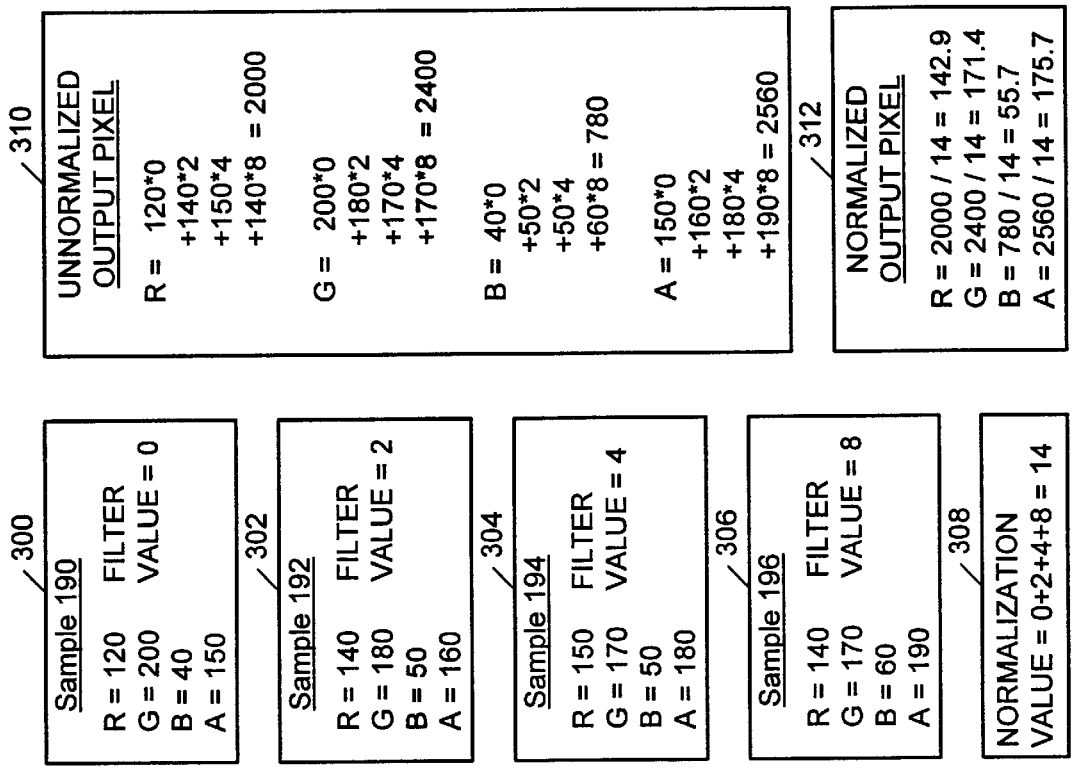
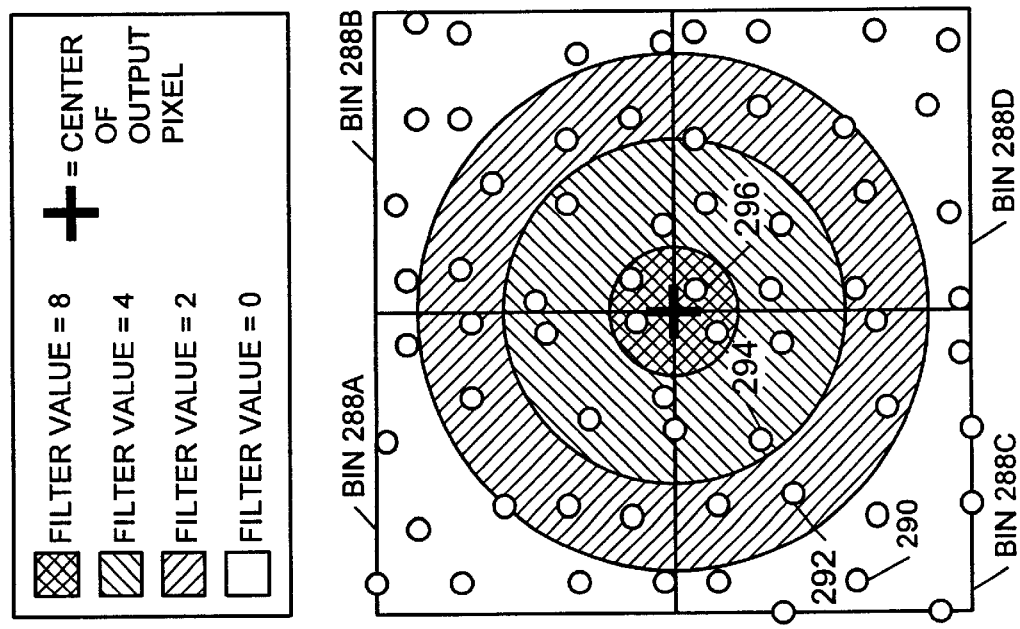
FIG. 20

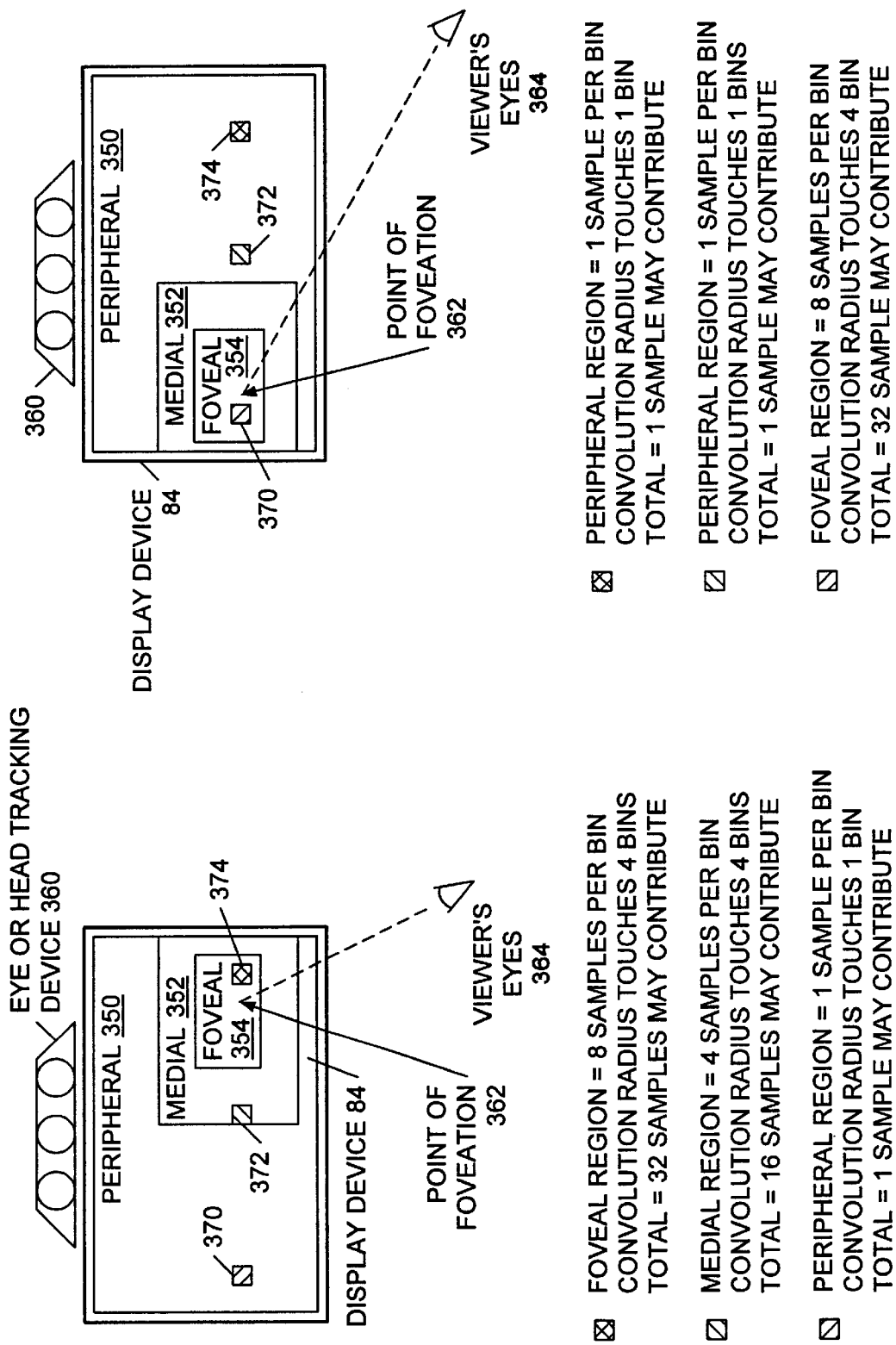

GRAPHICS SYSTEM CONFIGURED TO PERFORM PARALLEL SAMPLE TO PIXEL CALCULATION

This application is a continuation-in-part of co-pending application Ser. No. 09/251,844 titled "Graphics System With Programmable Real-Time Alpha Key Generation", filed on Feb. 17, 1999, which claims the benefit of U.S. Provisional Application No. 60/074,836, filed Feb. 17, 1998. These applications are hereby incorporated by reference in their entirety.

BACKGROUND OF THE INVENTION

1. Field of the Invention

This invention relates generally to the field of computer graphics and, more particularly, to high performance graphics systems.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modem graphics systems, however, incorporate graphics processors with a great deal of processing power. They now act more like coprocessors rather than simple translators. This change is due to the recent increase in both the complexity and amount of data being sent to the display device. For example, modem computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating "draw a box at these coordinates." The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

The processing power of 3D graphics systems has been improving at a breakneck pace. A few years ago, shaded images of simple objects could only be rendered at a few frames per second, while today's systems support rendering of complex objects at 60 Hz or higher. At this rate of increase, in the not too distant future, graphics systems will literally be able to render more pixels than a single human's visual system can perceive. While this extra performance may be useable in multiple-viewer environments, it may be wasted in more common primarily single-viewer environments. Thus, a graphics system is desired which is capable of matching the variable nature of the human resolution system (i.e., capable of putting the quality where it is needed or most perceivable).

While the number of pixels is an important factor in determining graphics system performance, another factor of equal import is the quality of the image. For example, an image with a high pixel density may still appear unrealistic if edges within the image are too sharp or jagged (also referred to as "aliased"). One well-known technique to overcome these problems is anti-aliasing. Anti-aliasing involves smoothing the edges of objects by shading pixels along the borders of graphical elements. More specifically, anti-aliasing entails removing higher frequency components from an image before they cause disturbing visual artifacts. For example, anti-aliasing may soften or smooth high contrast edges in an image by forcing certain pixels to intermediate values (e.g., around the silhouette of a bright object superimposed against a dark background).

Another visual effect used to increase the realism of computer images is alpha blending. Alpha blending is a technique that controls the transparency of an object, allowing realistic rendering of translucent surfaces such as water or glass. Another effect used to improve realism is fogging. Fogging obscures an object as it moves away from the viewer. Simple fogging is a special case of alpha blending in which the degree of alpha changes with distance so that the object appears to vanish into a haze as the object moves away from the viewer. This simple fogging may also be referred to as "depth cueing" or atmospheric attenuation, i.e., lowering the contrast of an object so that it appears less prominent as it recedes. More complex types of fogging go beyond a simple linear function to provide more complex relationships between the level of translucence and an object's distance from the viewer. Current state of the art software systems go even further by utilizing atmospheric models to provide low-lying fog with improved realism.

While the techniques listed above may dramatically improve the appearance of computer graphics images, they also have certain limitations. In particular, they may introduce their own aberrations and are typically limited by the density of pixels displayed on the display device.

As a result, a graphics system is desired which is capable of utilizing increased performance levels to increase not only the number of pixels rendered but also the quality of the image rendered. In addition, a graphics system is desired which is capable of utilizing increases in processing power to improve the results of graphics effects such as anti-aliasing.

Prior art graphics systems have generally fallen short of these goals. Prior art graphics systems use a conventional frame buffer for refreshing pixel/video data on the display. The frame buffer stores rows and columns of pixels that exactly correspond to respective row and column locations on the display. Prior art graphics system render 2D and/or 3D images or objects into the frame buffer in pixel form, and then read the pixels from the frame buffer during a screen refresh to refresh the display. Thus, the frame buffer stores the output pixels that are provided to the display. To reduce visual artifacts that may be created by refreshing the screen at the same time the frame buffer is being updated, most graphics systems' frame buffers are double-buffered.

To obtain more realistic images, some prior art graphics systems have gone further by generating more than one sample per pixel. As used herein, the term "sample" refers to calculated color information that indicates the color, depth (z), transparency, and potentially other information, of a particular point on an object or image. For example a sample may comprise the following component values: a red value, a green value, a blue value, a z value, and an alpha value (e.g., representing the transparency of the sample). A sample may also comprise other information, e.g., a z-depth value, a blur value, an intensity value, brighter-than-bright information, and an indicator that the sample consists partially or completely of control information rather than color information (i.e., "sample control information"). By calculating more samples than pixels (i.e., super-sampling), a more detailed image is calculated than can be displayed on the display device. For example, a graphics system may calculate four samples for each pixel to be output to the display device. After the samples are calculated, they are then combined or filtered to form the pixels that are stored in the frame buffer and then conveyed to the display device. Using pixels formed in this manner may create a more realistic final image because overly abrupt changes in the image may be smoothed by the filtering process.

These prior art super-sampling systems typically generate a number of samples that are far greater than the number of pixel locations on the display. These prior art systems typically have rendering processors that calculate the samples and store them into a render buffer. Filtering hardware then reads the samples from the render buffer, filters the samples to create pixels, and then stores the pixels in a traditional frame buffer. The traditional frame buffer is typically double-buffered, with one side being used for refreshing the display device while the other side is updated by the filtering hardware. Once the samples have been filtered, the resulting pixels are stored in a traditional frame buffer that is used to refresh to display device. These systems, however, have generally suffered from limitations imposed by the conventional frame buffer and by the added latency caused by the render buffer and filtering. Therefore, an improved graphics system is desired which includes the benefits of pixel super-sampling while avoiding the drawbacks of the conventional frame buffer.

U.S. patent application Ser. No. 09/251,844 titled "Graphics System with a Variable Resolution Sample Buffer" discloses a computer graphics system that utilizes a super-sampled sample buffer and a sample-to-pixel calculation unit for refreshing the display. The graphics processor generates a plurality of samples and stores them into a sample buffer. The graphics processor preferably generates and stores more than one sample for at least a subset of the pixel locations on the display. Thus, the sample buffer is a super-sampled sample buffer which stores a number of samples that may be far greater than the number of pixel locations on the display. The sample-to-pixel calculation unit is configured to read the samples from the super-sampled sample buffer and filter or convolve the samples into respective output pixels, wherein the output pixels are then provided to refresh the display. The sample-to-pixel calculation unit selects one or more samples and filters them to generate an output pixel. The sample-to-pixel calculation unit may operate to obtain samples and generate pixels which are provided directly to the display with no frame buffer there between.

SUMMARY OF THE INVENTION

The problems set forth above may at least in part be solved by a graphics system that is configured to utilize a sample buffer and a plurality of parallel sample-to-pixel calculation units, wherein the sample-pixel calculation units are configured to access different portions of the sample buffer in parallel. Advantageously, this configuration (depending upon the embodiment) may also allow the graphics system to use a sample buffer in lieu of a traditional frame buffer that stores pixels. Since the sample-to-pixel calculation units may be configured to operate in parallel, the latency of the graphics system may be reduced in some embodiments.

In one embodiment, the graphics system may include one or more graphics processors, a sample buffer, and a plurality of sample-to-pixel calculation units. The graphics processors may be configured to receive a set of three-dimensional graphics data and render a plurality of samples based on the graphics data. The sample buffer may be configured to store the plurality of samples (e.g., in a double-buffered configuration) for the sample-to-pixel calculation units, which are configured to receive and filter samples from the sample buffer to create output pixels. The output pixels are usable to form an image on a display device. Each of the sample-to-pixel calculation units are configured to generate pixels corresponding to a different region of the image. The region may be a vertical stripe (i.e., a column) of the image, a horizontal stripe (i.e., a row) of the image, or a rectangular portion of the image. Note, as used herein the terms "horizontal row" and "horizontal stripe" are used interchangeably, as are "vertical column" and "vertical stripe". Each region may overlap the other regions of the image to prevent visual aberrations (e.g., seams, lines, or tears in the image). As previously noted, each of the sample-to-pixel calculation units may advantageously be configured to operate in parallel on its own region or regions. The sample-to-pixel calculation units are configured to process the samples by (i) determining which samples are within a predetermined filter envelope, (ii) multiplying those samples by a weighting, (iii) summing the resulting values, and (iv) normalizing the results to form output pixels. The weighting value may vary with respect the sample's position within the filter envelope (e.g., the weighting factor may decrease as the samples move farther from the center of the filter envelope). In some embodiments, the weighting factor may be normalized or pre-normalized, in which case the resulting output pixel will not proceed through normalization because the output will already be normalized. Normalized weighting factors are adjusted to ensure that pixels generated with fewer contributing samples will not overpower pixels generated with more contributing samples. In contrast, if un-normalized weighting factors are used, the resulting pixel will typically proceed through normalization. Normalization will typically be performed in embodiments of the graphics system that allow for a variable number of samples to contribute to each output pixel. Normalization may also be performed in systems that allow variable sample patterns, and in systems in which the pitch of the centers of filters vary widely with respect to the sample pattern.

In some embodiments, the graphics system may be configured to dynamically change the size or type of regions being used (e.g., changing the width of the vertical columns used on a frame-by-frame basis). Some embodiments of the graphics system may support a variable resolution or variable density frame buffer. In these configurations, the graphics system is configured to render samples more densely in certain areas of the image (e.g., the center of the image or the portion of the image where the viewer's attention is most likely focused). Advantageously, the ability to dynamically vary the size and/or shape of the regions used may allow the graphics system to equalize (or come closer to equalizing) the number of samples that each sample-to-pixel calculation unit processes for a particular frame.

The samples may include color components and alpha (e.g., transparency) components, and may be stored in "bins" to simplify the process of storing and retrieving samples from the sample buffer. As described in greater detail below, bins are a means for organizing and dividing the sample buffer into smaller sets of storage locations. In addition, in some embodiments the three-dimensional graphics data may be received in a compressed form (e.g., using geometry compression). In these embodiments the graphics processors may be configured to decompress the three-dimensional graphics data before rendering the samples. As used herein, the term "color components" includes information on a per-sample or per-pixel basis that is usable to determine the color the pixel or sample. For example, RGB information and transparency information may be color components.

A method for rendering a set of three-dimensional graphics data is also contemplated. In one embodiment the method comprises: (i) receiving the three-dimensional graphics data, (ii) generating one or more samples based on the graphics data, (iii) storing the samples, (iv) selecting stored samples; and (iv) filtering the selected samples in parallel to form output pixels. The stored samples may be selected according to a plurality of regions, as described above.

BRIEF DESCRIPTION OF THE DRAWINGS

The foregoing, as well as other objects, features, and advantages of this invention may be more completely understood by reference to the following detailed description when read together with the accompanying drawings in which:

FIG. 4 illustrates traditional pixel calculation;

FIG. 5A illustrates one embodiment of super-sampling;

FIG. 5B illustrates a random distribution of samples;

FIG. 20 illustrates details of one embodiment of a sample to pixel calculation for an example set of samples;

FIGS. 24A–B illustrate details of one embodiment of a method for utilizing eye-tracking to vary the density of samples.

Figure 1A:
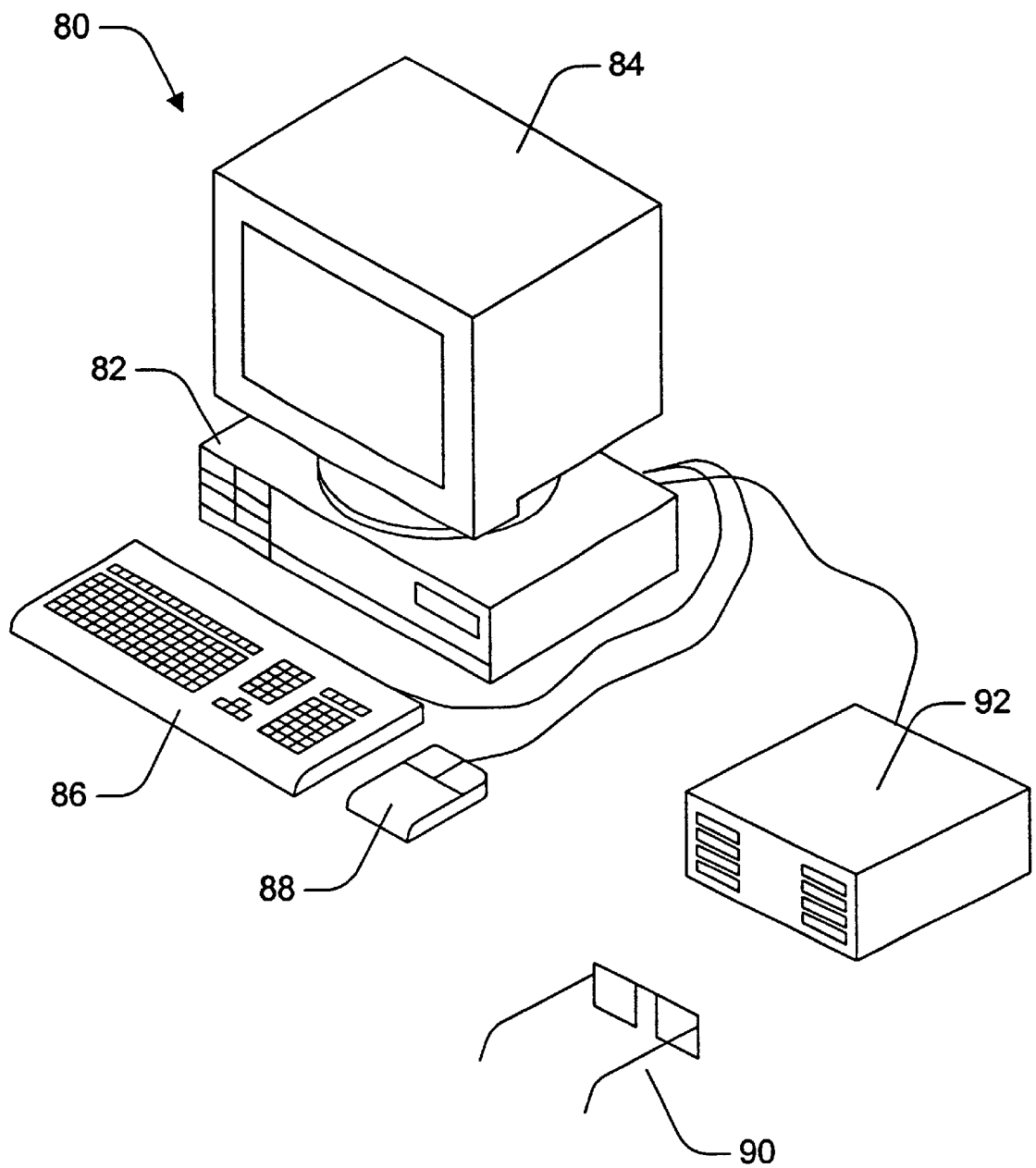
FIG. 1A illustrates one embodiment of a computer system that includes one embodiment of a graphics system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Computer System—FIG. 1A

Referring now to FIG. 1A, one embodiment of a computer system 80 that includes a three-dimensional (3-D) graphics system is shown. The 3-D graphics system may be comprised in any of various systems, including a computer system, network PC, Internet appliance, a television, including HDTV systems and interactive television systems, personal digital assistants (PDAs), and other devices which display 2D and/or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, body sensors, etc.). Application software may be executed by the computer system 80 to display 3-D graphical objects on display device 84. As described further below, the 3-D graphics system in computer system 80 includes a super-sampled sample buffer with a programmable real-time sample-to-pixel calculation unit to improve the quality and realism of images displayed on display device 84.

Computer system 80 may also include eye-tracking sensor 92 and/or 3D-glasses 90. 3D glasses 90 may be active (e.g., LCD shutter-type) or passive (e.g., polarized, red-green, etc.) and may allow the user to view a more three-dimensional image on display device 84. With glasses 90, each eye receives a slightly different image, which the viewer's mind interprets as a "true" three-dimensional view. Sensor 92 may be configured to determine which part of the image on display device 84 that the viewer is looking at (i.e., that the viewer's field of view is centered on). The information provided by sensor 92 may used in a number of different ways as will be described below.

Figure 1B:
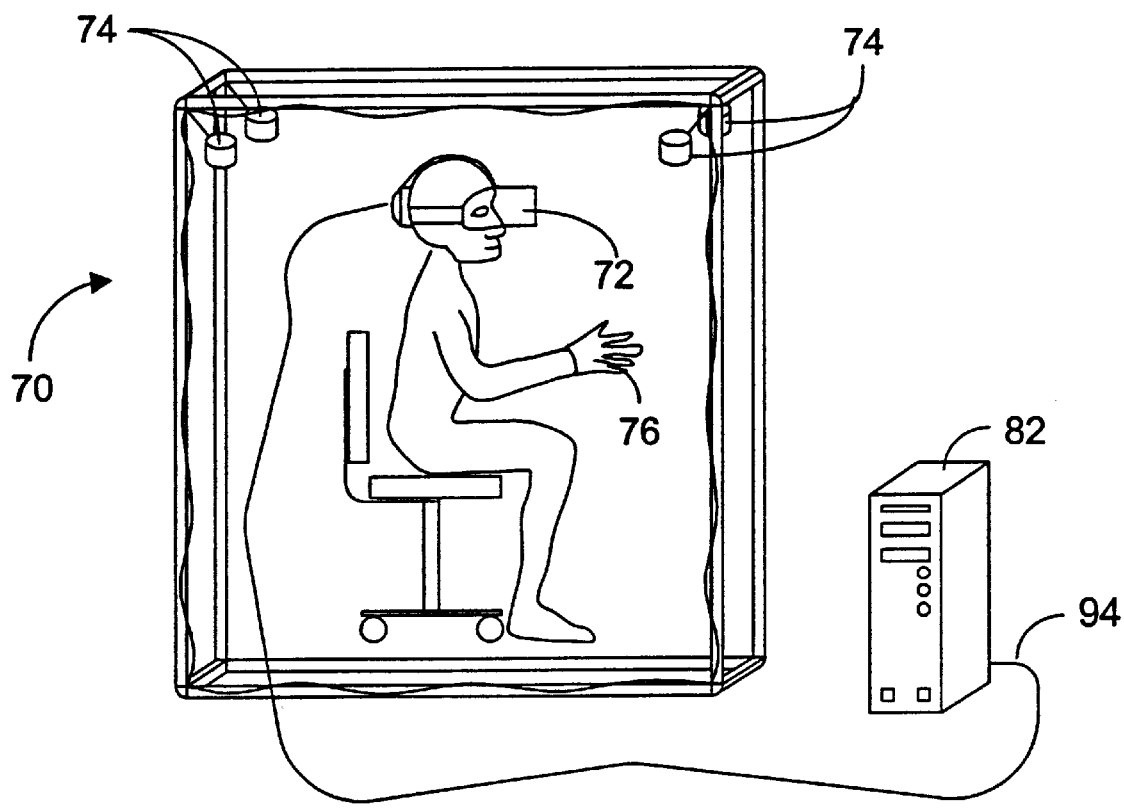
FIG. 1B illustrates another embodiment of a computer system that is part of a virtual reality work station.

Virtual Reality Computer System—FIG. 1B

FIG. 1B illustrates another embodiment of a computer system 70. In this embodiment, the system comprises a head-mounted display device 72, head-tracking sensors 74, and a data glove 76. Head mounted display 72 may be coupled to system unit 82 via a fiber optic link 94, or one or more of the following: an electrically-conductive link, an infra-red link, or a wireless (e.g., RF) link. Other embodiments are possible and contemplated.

Figure 2:
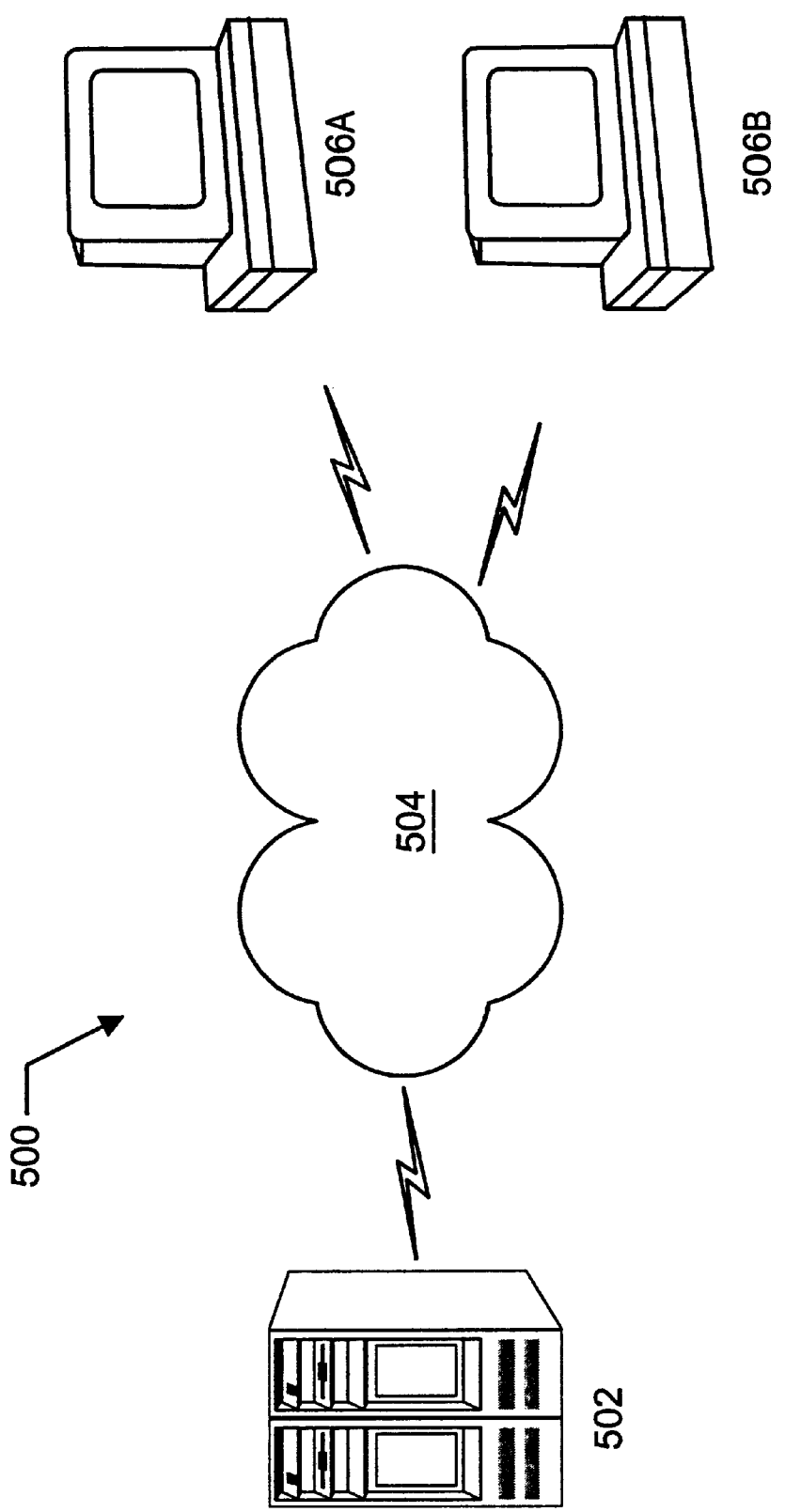
FIG. 2 illustrates one embodiment of a network to which the computers systems of FIGS. 1A–B may be connected.

Computer Network—FIG. 2

Referring now to FIG. 2, a computer network 500 is shown comprising at least one server computer 502 and one or more client computers 506A–N. (In the embodiment shown in FIG. 4, client computers 506A–B are depicted). One or more of the client systems may be configured similarly to computer system 80, with each having one or more graphics systems 112 as described above. Server 502 and client(s) 506 may be joined through a variety of connections 504, such as a local-area network (LAN), a wide-area network (WAN), or an Internet connection. In one embodiment, server 502 may store and transmit 3-D geometry data (which may be compressed) to one or more of clients 506. The clients 506 receive the compressed 3-D geometry data, decompress it (if necessary) and then render the geometry data. The rendered image is then displayed on the client's display device. The clients render the geometry data and display the image using super-sampled sample buffer and real-time filter techniques described above. In another embodiment, the compressed 3-D geometry data may be transferred between client computers 506.

Figure 3A:
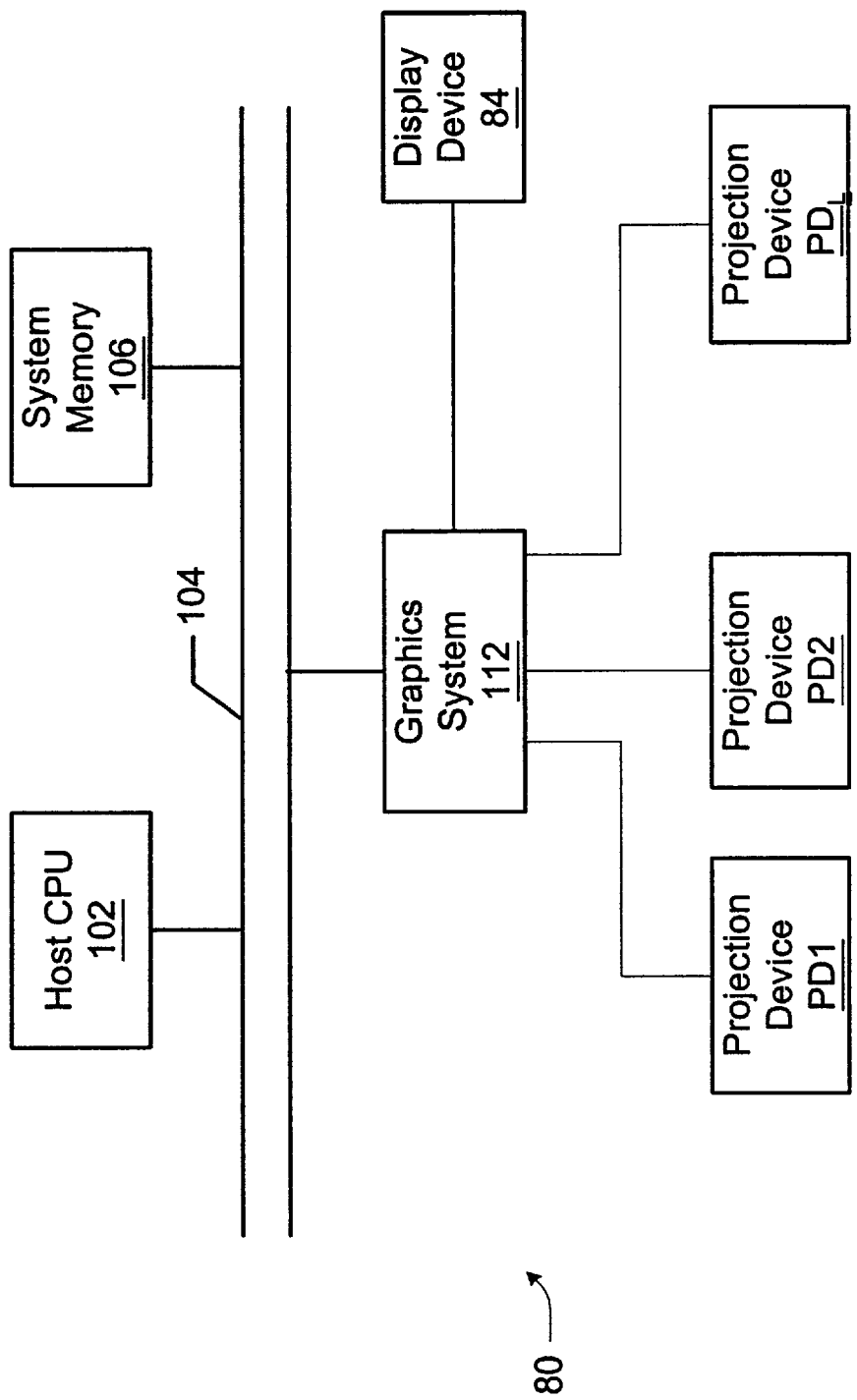
FIG. 3A is a diagram illustrating another embodiment of the graphics system of FIG. 1 as a virtual reality work station.

Computer System Block Diagram—FIG. 3A

FIG. 3A presents a simplified block diagram for computer system 80. Elements of computer system 80 that are not necessary for an understanding of the present invention are suppressed for convenience. Computer system 80 comprises a host central processing unit (CPU) 102 and a 3-D graphics system 112 coupled to system bus 104. A system memory 106 may also be coupled to system bus 104.

Host CPU 102 may be realized by any of a variety of processor technologies. For example, host CPU 102 may comprise one or more general purpose microprocessors, parallel processors, vector processors, digital signal processors, etc., or any combination thereof. System memory 106 may include one or more memory subsystems representing different types of memory technology. For example, system memory 106 may include read-only memory (ROM), random access memory (RAM)—such as static random access memory (SRAM), synchronous dynamic random access memory (SDRAM), and Rambus dynamic random access memory (RDRAM)—and mass storage devices.

System bus 104 may comprise one or more communication buses or host computer buses (for communication between host processors and memory subsystems). In addition, various peripheral devices and peripheral buses may be connected to system bus 104.

Graphics system 112 is configured according to the principles of the present invention, and may couple to system bus 104 by a crossbar switch or any other type of bus connectivity logic. Graphics system 112 drives each of projection devices $PD_I$–$PD_L$ and display device 84 with a corresponding video signal.

It is noted that the 3-D graphics system 112 may couple to one or more busses of various types in addition to system bus 104. Furthermore, the 3D graphics system 112 may couple to a communication port, and thereby, directly receive graphics data from an external source such as the Internet or a local area network.

Host CPU 102 may transfer information to/from graphics system 112 according to a programmed input/output (I/O) protocol over system bus 104. Alternately, graphics system 112 may access system memory 106 according to a direct memory access (DMA) protocol or through intelligent bus-mastering.

A graphics application program conforming to an application programming interface (API) such as OpenGL® (a registered trademark of Silicon Graphics, Inc.) or Java3D™ (a trademark of Sun Microsystems, Inc.) may execute on host CPU 102 and generate commands and data that define a geometric primitive such as a polygon for output on projection devices $PD_I$ through $PD_L$ and/or display device 84. Host CPU 102 may transfer this graphics data to system memory 106. Thereafter, the host CPU 102 may transfer the graphics data to graphics system 112 over system bus 104. In another embodiment, graphics system 112 may read geometry data arrays from system memory 106 using DMA access cycles. In yet another embodiment, graphics system 112 may be coupled to system memory 106 through a direct port, such as an Advanced Graphics Port (AGP) promulgated by Intel Corporation.

Graphics system 112 may receive graphics data from any of various sources including host CPU 102, system memory 106 or any other memory, external sources such as a network (e.g., the Internet) or a broadcast medium (e.g. television).

As will be described below, graphics system 112 may be configured to allow more efficient microcode control, which results in increased performance for handling of incoming color values corresponding to the polygons generated by host CPU 102.

While graphics system 112 is depicted as part of computer system 80, graphics system 112 may also be configured as a stand-alone device. Graphics system 112 may also be configured as a single chip device or as part of a system-on-a-chip or a multi-chip module.

Graphics system 112 may be comprised in any of various systems, including a network PC, an Internet appliance, a television (including an HDTV system or an interactive television system), a personal digital assistant (PDA), or other devices which display 2D and/or 3D graphics.

As described further below, the 3-D graphics system within in computer system 80 includes a super-sampled sample buffer and a plurality of programmable sample-to-pixel calculation units to improve the quality and realism of images displayed by projection devices $PD_I$ through $PD_L$ and/or display device 84. Each sample-to-pixel calculation unit may include a filter (i.e., convolution) pipeline or other hardware for generating pixel values (e.g. red, green and blue values) based on samples in the sample buffer. Each sample-to-pixel calculation unit may obtain samples from the sample buffer and generate pixel values which are provided to any of projection devices $PD_I$ through $PD_L$ or display device 84. The sample-to-pixel calculation units may operate in a "real-time" or "on-the-fly" fashion.

As used herein the terms "filter" and "convolve" are used interchangeably. As used herein, the term "real-time" refers to a process or operation that is performed at or near the refresh rate of projection devices $PD_I$ through $PD_L$ or display device 84. The term "on-the-fly" refers to a process or operation that generates images at a rate near or above the minimum rate required for displayed motion to appear smooth (i.e., motion fusion) and for the light intensity to appear continuous (i.e., flicker fusion). These concepts are further described in the book "Spatial Vision" by Russel L. De Valois and Karen K. De Valois, Oxford University Press, 1988.

Figure 3B:
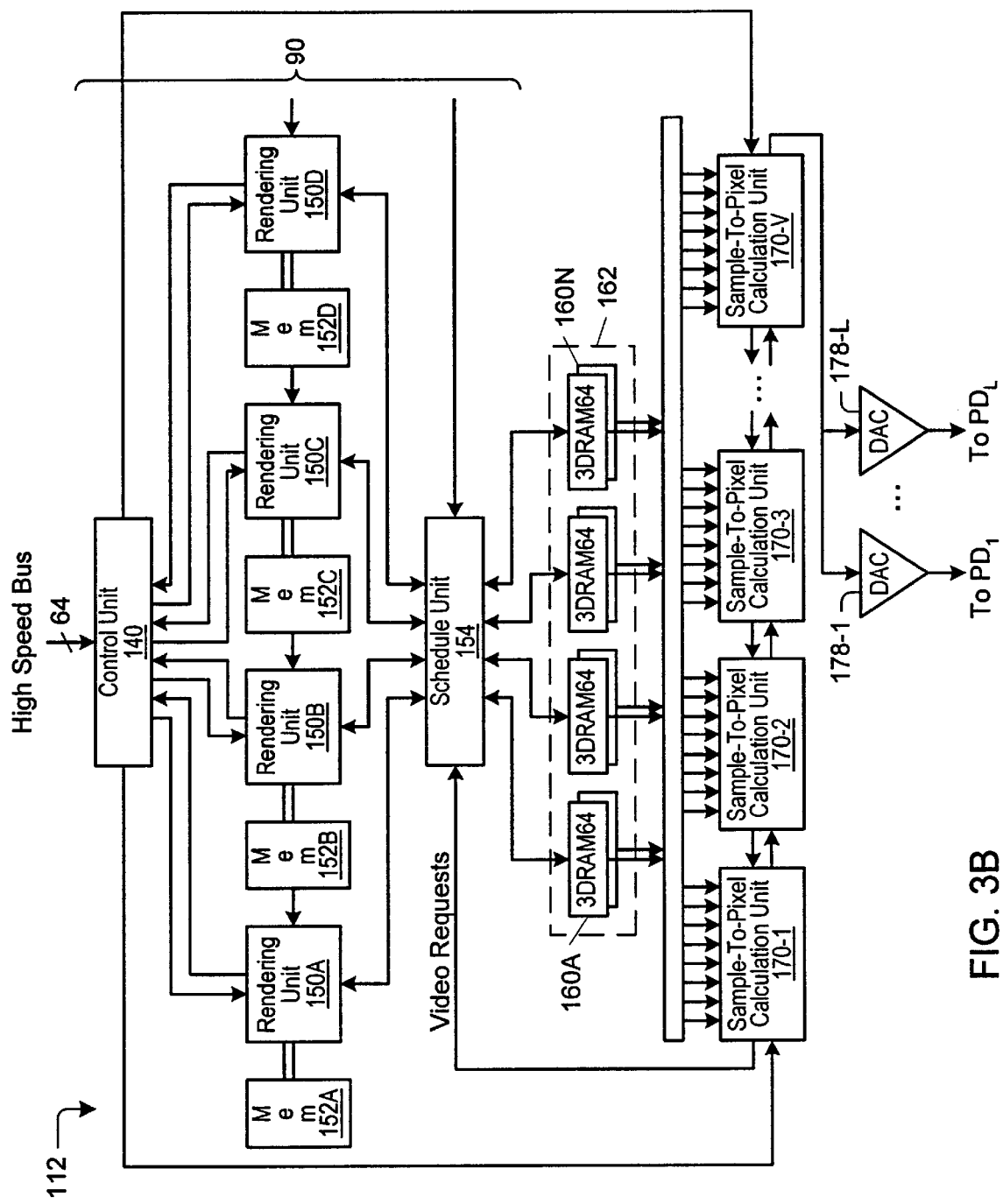
FIG. 3B is more detailed diagram illustrating one embodiment of a graphics system with a sample buffer.

Graphics System—FIG. 3B

FIG. 3B presents a block diagram for one embodiment of graphics system 112 according to the present invention. Graphics system 112 may comprise a graphics processing unit (GPU) 90, one or more super-sampled sample buffers 162, and one or more sample-to-pixel calculation units 170-1 through 170-V. Graphics system 112 may also comprise one or more digital-to-analog converters (DACs) 178-1 through 178-L. Graphics processing unit 90 may comprise any combination of processor technologies. For example, graphics processing unit 90 may comprise specialized graphics processors or calculation units, multimedia processors, DSPs, or general purpose processors.

In one embodiment, graphics processing unit 90 may comprise one or more rendering units 150A–D. Graphics processing unit 90 may also comprise one or more control units 140, one or more data memories 152A–D, and one or more schedule units 154. Sample buffer 162 may comprise one or more sample memories 160A–160N.

A. Control Unit 140

Control unit 140 operates as the interface between graphics system 112 and computer system 80 by controlling the transfer of data between graphics system 112 and computer system 80. In embodiments of graphics system 112 that comprise two or more rendering units 150A–D, control unit 140 may also divide the stream of data received from computer system 80 into a corresponding number of parallel streams that are routed to the individual rendering units 150A–D. The graphics data may be received from computer system 80 in a compressed form. Graphics data compression may advantageously reduce the required transfer bandwidth between computer system 80 and graphics system 112. In one embodiment, control unit 140 may be configured to split and route the received data stream to rendering units 150A–D in compressed form.

The graphics data may comprise one or more graphics primitives. As used herein, the term graphics primitive includes polygons, parametric surfaces, splines, NURBS (non-uniform rational B-splines), subdivision surfaces, fractals, volume primitives, and particle systems. These graphics primitives are described in detail in the text book entitled "Computer Graphics: Principles and Practice" by James D. Foley, et al., published by Addison-Wesley Publishing Co., Inc., 1996.

It is noted that the embodiments and examples of the invention presented herein are described in terms of polygons for the sake of simplicity. However, any type of graphics primitive may be used instead of or in addition to polygons in these embodiments and examples.

B. Rendering Units

Rendering units 150A–D (also referred to herein as draw units) are configured to receive graphics instructions and data from control unit 140 and then perform a number of functions which depend on the exact implementation. For example, rendering units 150A–D may be configured to perform decompression (if the received graphics data is presented in compressed form), transformation, clipping, lighting, texturing, depth cueing, transparency processing, set-up, visible object determination, and virtual screen rendering of various graphics primitives occurring within the graphics data.

Depending upon the type of compressed graphics data received, rendering units 150A–D may be configured to perform arithmetic decoding, run-length decoding, Huffman decoding, and dictionary decoding (e.g., LZ77, LZSS, LZ78, and LZW). In another embodiment, rendering units 150A–D may be configured to decode graphics data that has been compressed using geometric compression. Geometric compression of 3D graphics data may achieve significant reductions in data size while retaining most of the image quality. Two methods for compressing and decompressing 3D geometry are described in:

U.S. Pat. No. 5,793,371, application Ser. No. 08/511,294, filed on Aug. 4, 1995, entitled "Method And Apparatus For Geometric Compression Of Three-Dimensional Graphics Data," Attorney Docket No. 5181-05900; and U.S. patent application Ser. No. 09/095,777, filed on Jun. 11, 1998, entitled "Compression of Three-Dimensional Geometry Data Representing a Regularly Tiled Surface Portion of a Graphical Object," Attorney Docket No. 5181-06602.

In embodiments of graphics system 112 that support decompression, the graphics data received by each rendering unit 150 is decompressed into one or more graphics "primitives" which may then be rendered. The term primitive refers to components of objects that define its shape (e.g., points, lines, triangles, polygons in two or three dimensions, polyhedra, voxels, or free-form surfaces in three dimensions). Each rendering unit 150 may be any suitable type of high performance processor (e.g., a specialized graphics processor or calculation unit, a multimedia processor, a digital signal processor, or a general purpose processor).

Transformation refers to applying a geometric operation to a primitive or an object comprising a set of primitives. For example, an object represented by a set of vertices in a local coordinate system may be embedded with arbitrary position, orientation, and size in world space using an appropriate sequence of translation, rotation, and scaling transformations. Transformation may also comprise reflection, skewing, or any other affine transformation. More generally, transformations may comprise nonlinear operations.

Lighting refers to calculating the illumination of objects. Lighting computations result in an assignment of color and/or brightness to objects or to selected points (e.g. vertices) on objects. Depending upon the shading algorithm being used (e.g., constant, Gourand, or Phong shading), lighting may be evaluated at a number of different locations. For example, if constant shading is used (i.e., the lighted surface of a polygon is assigned a constant illumination value), then the lighting need only be calculated once per polygon. If Gourand shading is used, then the lighting is calculated once per vertex. Phong shading calculates the lighting on a per-sample basis.

Clipping refers to the elimination of graphics primitives or portions of graphics primitives which lie outside of a 3-D view volume in world space. The 3-D view volume may represent that portion of world space which is visible to a virtual observer situated in world space. For example, the view volume may be a solid cone generated by a 2-D view window and a view point located in world space. The solid cone may be imagined as the union of all rays emanating from the view point and passing through the view window. The view point may represent the world space location of the virtual observer. Primitives or portions of primitives which lie outside the 3-D view volume are not currently visible and may be eliminated from further processing. Primitives or portions of primitives which lie inside the 3-D view volume are candidates for projection onto the 2-D view window.

In order to simplify the clipping and projection computations, primitives may be transformed into a second, more convenient, coordinate system referred to herein as the viewport coordinate system. In viewport coordinates, the view volume maps to a canonical 3-D viewport which may be more convenient for clipping against. The term set-up refers to this mapping of graphics primitives into viewport coordinates.

Graphics primitives or portions of primitives which survive the clipping computation may be projected onto a 2-D viewport depending on the results of a visibility determination. Instead of clipping in 3-D, graphics primitives may be projected onto a 2-D view plane (which includes the 2-D viewport) and then clipped with respect to the 2-D viewport.

Virtual display rendering refers to calculations that are performed to generate samples for projected graphics primitives. For example, the vertices of a triangle in 3-D may be projected onto the 2-D viewport. The projected triangle may be populated with samples, and values (e.g. red, green, blue and z values) may be assigned to the samples based on the corresponding values already determined for the projected vertices. For example, the red value for each sample in the projected triangle may be interpolated from the known red values of the vertices. These sample values for the projected triangle may be stored in sample buffer 162. Depending upon the embodiment, sample buffer 16 also stores a z value for each sample. This z-value is stored with the sample for a number of reasons, including depth-buffering. As samples for successive primitives are rendered, a virtual image accumulates in sample buffer 162. Thus, the 2-D viewport is said to be a virtual screen on which the virtual image is rendered. The sample values comprising the virtual image are stored into sample buffer 162. Points in the 2-D viewport are described in terms of virtual screen coordinates X and Y, and are said to reside in virtual screen space.

When the virtual image is complete, e.g., when all graphics primitives have been rendered, sample-to-pixel calculation units 170 may access the samples comprising the virtual image and may filter the samples to generate pixel values. In other words, the sample-to-pixel calculation units 170 may perform a spatial convolution of the virtual image with respect to a convolution kernel f(X,Y) to generate pixel values. For example, a red value $R_p$ for a pixel P may be computed at any location $(X_p,Y_p)$ in virtual screen space based on the relation $$R_p = \frac{1}{E}\sum f(X_k - X_p, Y_k - Y_p)R(X_k, Y_k),$$

where the summation is evaluated at samples $(X_k,Y_k)$ in the neighborhood of location $(X_p, Y_p)$. Since convolution kernel f(X,Y) is non-zero only in a neighborhood of the origin, the displaced kernel $f(X-X_p, Y-Y_p)$ may take non-zero values only in a neighborhood of location $(X_p,Y_p)$. The value E is a normalization value that may be computed according to the relation $$E = \Sigma f(X_k - X_p, Y_k - Y_p),$$

where the summation is evaluated in the same neighborhood as above. The summation for the normalization value E may be performed in parallel with the summation for the red pixel value $R_p$. The location $(X_p,Y_p)$ may be referred to as a pixel center or pixel origin. In the case where the convolution kernel f(X,Y) is symmetric with respect to the origin (0,0), the term pixel center maybe used.

The pixel values may be presented to projection devices $PD_1$ through $PD_L$ for display on projection screen SCR. The projection devices each generate a portion of integrated image IMG. Sample-to-pixel calculation units 170 may also generate pixel values for display on display device 84.

In the embodiment of graphics system 112 shown in FIG. 3, rendering units 150A–D calculate sample values instead of pixel values. This allows rendering units 150A–D to perform super-sampling, i.e. to calculate more than one sample per pixel. Super-sampling in the context of the present invention is discussed more thoroughly below. More details on super-sampling are discussed in the following books: "Principles of Digital Image Synthesis" by Andrew Glassner, 1995, Morgan Kaufman Publishing (Volume 1); and "Renderman Companion:" by Steve Upstill, 1990, Addison Wesley Publishing.

Sample buffer 162 may be double-buffered so that rendering units 150A–D may write samples for a first virtual image into a first portion of sample buffer 162, while a second virtual image is simultaneously read from a second portion of sample buffer 162 by sample-to-pixel calculations units 170.

It is noted that the 2-D viewport and the virtual image which is rendered with samples into sample buffer 162 may correspond to an area larger than that area which is physically displayed as integrated image IMG or display image DIM. For example, the 2-D viewport may include a viewable subwindow. The viewable subwindow may correspond to integrated image IMG and/or display image DIM, while the marginal area of the 2-D viewport (outside the viewable subwindow) may allow for various effects such as panning and zooming. In other words, only that portion of the virtual image which lies within the viewable subwindow gets physically displayed. In one embodiment, the viewable subwindow equals the whole of the 2-D viewport. In this case, all of the virtual image gets physically displayed.

Note that rendering units 150A–D may comprise a number of smaller and more specialized functional units, e.g., one or more set-up/decompress units and one or more lighting units.

C. Data Memories

Each of rendering units 150A–D may be coupled to a corresponding one of instruction and data memories 152A–D. In one embodiment, each of memories 152A–D may be configured to store both data and instructions for a corresponding one of rendering units 150A–D. While implementations may vary, in one embodiment, each data memory 152A–D may comprise two 8 MByte SDRAMs, providing a total of 16 MBytes of storage for each rendering unit 150A–D. In another embodiment, RDRAMs (Rambus DRAMs) may be used to support the decompression and set-up operations of each rendering unit, while SDRAMs may be used to support the draw functions of each rendering unit. Data memories 152A–D may also be referred to as texture and render memories 152A–D.

D. Schedule Unit

Schedule unit 154 may be coupled between rendering units 150A–D and sample memories 160A–N. Schedule unit 154 is configured to sequence the completed samples and store them in sample memories 160A–N. Note in larger configurations, multiple schedule units 154 may be used in parallel. In one embodiment, schedule unit 154 may be implemented as a crossbar switch.

E. Sample Memories

Super-sampled sample buffer 162 comprises sample memories 160A–160N, which are configured to store the plurality of samples generated by rendering units 150A–D. As used herein, the term "sample buffer" refers to one or more memories which store samples. As previously noted, samples may be filtered to form each output pixel value. Output pixel values may be provided to projection devices $PD_1$ through $PD_L$ for display on projection screen SCR. Output pixel values may also be provided to display device 84. Sample buffer 162 may be configured to support super-sampling, critical sampling, or sub-sampling with respect to pixel resolution. In other words, the average distance between samples $(X_k, Y_k)$ in the virtual image (stored in sample buffer 162) may be smaller than, equal to, or larger than the average distance between pixel centers in virtual screen space. Furthermore, because the convolution kernel $f(X,Y)$ may take non-zero functional values over a neighborhood which spans several pixel centers, a single sample may contribute to several output pixel values.

Sample memories 160A–160N may comprise any of various types of memories (e.g., SDRAMs, SRAMs, RDRAMs, 3DRAMs, or next-generation 3DRAMs) in varying sizes. In one embodiment, each schedule unit 154 is coupled to four banks of sample memories, wherein each bank comprises four 3DRAM-64 memories. Together, the 3DRAM-64 memories may form a 116-bit deep super-sampled sample buffer that stores multiple samples per pixel. For example, in one embodiment, each sample memory 160A–160N may store up to sixteen samples per pixel.

3DRAM-64 memories are specialized memories configured to support full internal double buffering with single buffered Z in one chip. The double buffered portion comprises two RGBX buffers, wherein X is a fourth channel that can be used to store other information (e.g., alpha). 3DRAM-64 memories also have a lookup table that takes in window ID information and controls an internal 2-1 or 3-1 multiplexer that selects which buffer's contents will be output. 3DRAM-64 memories are next-generation 3DRAM memories that may soon be available from Mitsubishi Electric Corporation's Semiconductor Group. In one embodiment, four chips used in combination are sufficient to create a double-buffered 1280×1024 super-sampled sample buffer.

Since the 3DRAM-64 memories are internally double-buffered, the input pins for each of the two frame buffers in the double-buffered system are time multiplexed (using multiplexers within the memories). The output pins may similarly be time multiplexed. This allows reduced pin count while still providing the benefits of double buffering. 3DRAM-64 memories further reduce pin count by not having z output pins. Since z comparison and memory buffer selection are dealt with internally, use of the 3DRAM-64 memories may simplify the configuration of sample buffer 162. For example, sample buffer 162 may require little or no selection logic on the output side of the 3DRAM-64 memories. The 3DRAM-64 memories also reduce memory bandwidth since information may be written into a 3DRAM-64 memory without the traditional process of reading data out, performing a z comparison, and then writing data back in. Instead, the data may be simply written into the 3DRAM-64 memory, with the memory performing the steps described above internally.

However, in other embodiments of graphics system 112, other memories (e.g., SDRAMs, SRAMs, RDRAMs, or current generation 3DRAMs) may be used to form sample buffer 162.

Graphics processing unit 90 may be configured to generate a plurality of sample positions according to a particular sample positioning scheme (e.g., a regular grid, a perturbed regular grid, etc.). Alternatively, the sample positions (or offsets that are added to regular grid positions to form the sample positions) may be read from a sample position memory (e.g., a RAM/ROM table). Upon receiving a polygon that is to be rendered, graphics processing unit 90 determines which samples fall within the polygon based upon the sample positions. Graphics processing unit 90 renders the samples that fall within the polygon and stores rendered samples in sample memories 160A–N. Note as used herein the terms render and draw are used interchangeably and refer to calculating color values for samples. Depth values, alpha values, and other per-sample values may also be calculated in the rendering or drawing process.

F. Sample-to-pixel Calculation Units

Sample-to-pixel calculation units 170-1 through 170-V (collectively referred to as sample-to-pixel calculation units 170) may be coupled between sample memories 160A–N and DACs 178-1 through 178-L. Sample-to-pixel calculation units 170 are configured to read selected samples from sample memories 160A–N and then perform a convolution (i.e. a filtering operation) on the samples to generate the output pixel values which are provided to DACs 178-1 through 178-L. The sample-to-pixel calculation units 170 may be programmable to allow them to perform different filter functions at different times, depending upon the type of output desired. In one embodiment, the sample-to-pixel calculation units 170 may implement a 5×5 super-sample reconstruction band-pass filter to convert the super-sampled sample buffer data (stored in sample memories 160A–N) to pixel values. In other embodiments, calculation units 170 may filter a selected number of samples to calculate an output pixel. The selected samples may be multiplied by a spatial weighting function that gives weights to samples based on their position with respect to the center of the pixel being calculated. The filtering operation may use any of a variety of filters, either alone or in combination. For example, the convolution operation may employ a tent filter, a circular filter, an elliptic filter, a Mitchell filter, a band pass filter, a sync function filter, etc.

Sample-to-pixel calculation units 170 may also be configured with one or more of the following features: color look-up using pseudo color tables, direct color, inverse gamma correction, filtering of samples to pixels, programmable gamma encoding, and optionally color space conversion. Other features of sample-to-pixel calculation units 170 may include programmable video timing generators, programmable pixel clock synthesizers, edge-blending functions, hotspot correction functions, color space and crossbar functions. Once the sample-to-pixel calculation units have manipulated the timing and color of each pixel, the pixels are output to DACs 178-1 through 178-L.

G. DACs

Digital-to-Analog Converters (DACs) 178-1 through 178-L (collectively referred to as DACs 178) operate as the final output stage of graphics system 112. DACs 178 translate digital pixel data received from calculation units 170 into analog video signals. Each of DACs 178-1 through 178-L may be coupled to a corresponding one of projections devices $PD_I$ through $PD_L$. DAC 178-1 receives a first stream of digital pixel data from one or more of calculation units 170, and converts the first stream into a first video signal. The first video signal is provided to projection device $PD_I$. Similarly, each of DACs 178-1 through 178-L receive a corresponding stream of digital pixel data, and convert the digital pixel data stream into a corresponding analog video signal which is provided to a corresponding one of projection devices $PD_I$ through $PD_L$.

Note in one embodiment DACs 178 may be bypassed or omitted completely in order to output digital pixel data in lieu of analog video signals. This may be useful projection devices $PD_I$ through $PD_L$ are based on a digital technology (e.g., an LCD-type display or a digital micro-mirror display).

Super-Sampling—FIGS. 4–5

FIG. 4 illustrates a portion of virtual screen space in a non-super-sampled example. The dots denote sample locations, and the rectangular boxes superimposed on virtual screen space define pixel boundaries. One sample is located in the center of each pixel, and values of red, green, blue, z, etc. are computed for the sample. For example, sample 74 is assigned to the center of pixel 70. Although rendering units 150 may compute values for only one sample per pixel, sample-to-pixel calculation units 170 may still compute output pixel values based on multiple samples, e.g. by using a convolution filter whose support spans several pixels.

Turning now to FIG. 5A, an example of one embodiment of super-sampling is illustrated. In this embodiment, two samples are computed per pixel. The samples are distributed according to a regular grid. Even through there are more samples than pixels in the figure, output pixel values could be computed using one sample per pixel, e.g. by throwing out all but the sample nearest to the center of each pixel. However, a number of advantages arise from computing pixel values based on multiple samples.

A support region 72 is superimposed over pixel 70, and illustrates the support of a filter which is localized at pixel 70. The support of a filter is the set of locations over which the filter (i.e. the filter kernel) takes non-zero values. In this example, the support region 72 is a circular disc. The output pixel values (e.g. red, green, blue and z values) for pixel 70 are determined only by samples 74A and 74B, because these are the only samples which fall within support region 72.

This filtering operation may advantageously improve the realism of a displayed image by smoothing abrupt edges in the displayed image (i.e., by performing anti-aliasing). The filtering operation may simply average the values of samples 74A–B to form the corresponding output values of pixel 70, or it may increase the contribution of sample 74B (at the center of pixel 70) and diminish the contribution of sample 74A (i.e., the sample farther away from the center of pixel 70). The filter, and thus support region 72, is repositioned for each output pixel being calculated so the center of support region 72 coincides with the center position of the pixel being calculated. Other filters and filter positioning schemes are also possible and contemplated.

In the example of FIG. 5A, there are two samples per pixel. In general, however, there is no requirement that the number of samples be related to the number of pixels. The number of samples may be completely independent of the number of pixels. For example, the number of samples may be smaller than the number of pixels. (This is the condition that defines sub-sampling).

Turning now to FIG. 5B, another embodiment of super-sampling is illustrated. In this embodiment, the samples are positioned randomly. Thus, the number of samples used to calculate output pixel values may vary from pixel to pixel. Render units 150A–D calculate color information at each sample position.

Super-Sampled Sample Buffer with Real-Time Sample-To-Pixel Calculation—FIGS. 6–10

Figure 6:
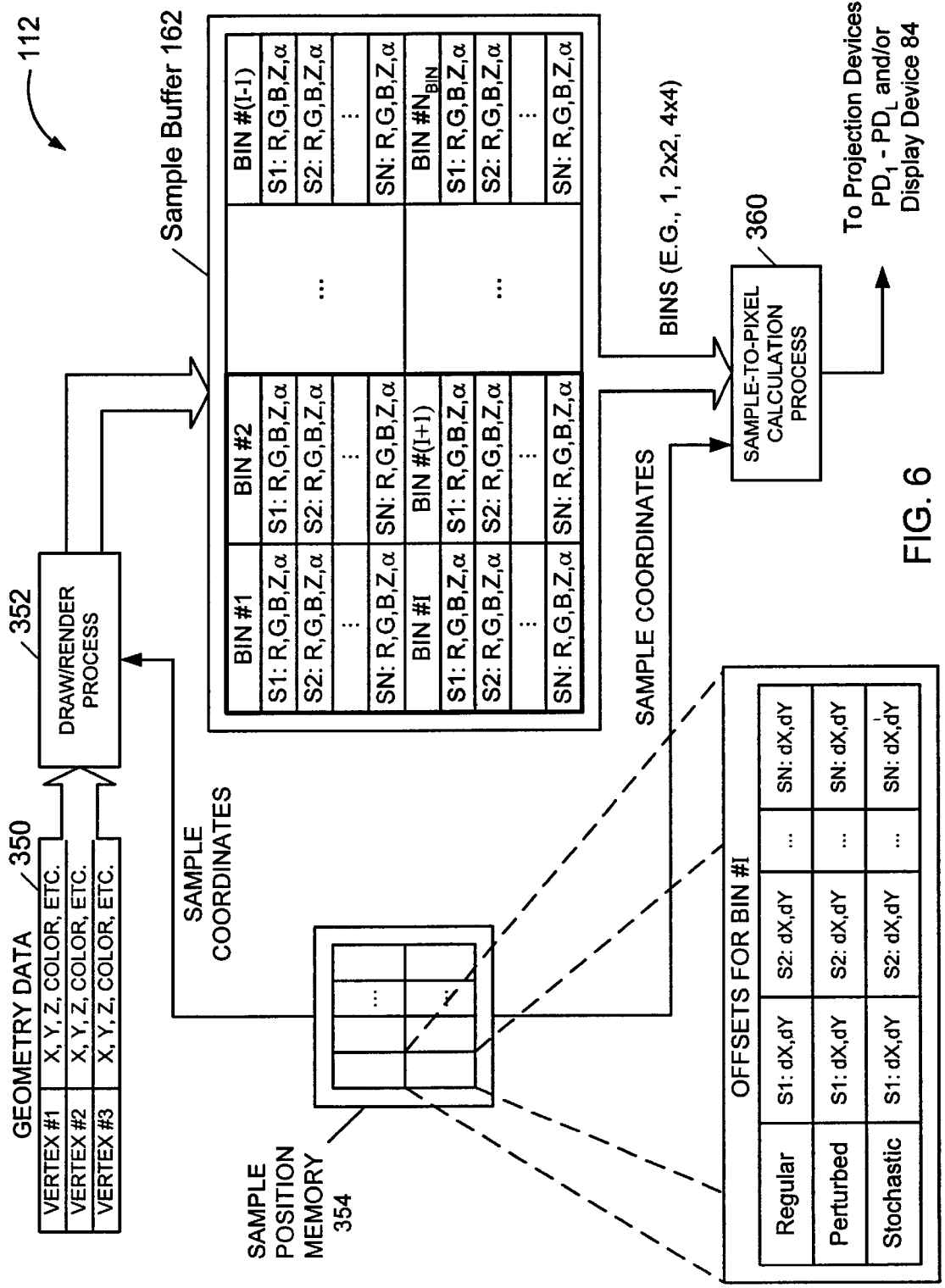
FIG. 6 illustrates details of one embodiment of a graphics system having one embodiment of a variable resolution super-sampled sample buffer.

FIG. 6 illustrates one possible configuration for the flow of data through one embodiment of graphics system 112. As the figure shows, geometry data 350 is received by graphics system 112 and used to perform draw process 352. The draw process 352 is implemented by one or more of control unit 140, rendering units 150, data memories 152, and schedule unit 154. Geometry data 350 comprises data for one or more polygons. Each polygon comprises a plurality of vertices (e.g., three vertices in the case of a triangle), some of which may be shared among multiple polygons. Data such as x, y, and z coordinates, color data, lighting data and texture map information may be included for each vertex.

In addition to the vertex data, draw process 352 (which may be performed by rendering units 150A–D) also receives sample position information from a sample position memory 354. The sample position information defines the location of samples in virtual screen space, i.e. in the 2-D viewport. Draw process 352 selects the samples that fall within the polygon currently being rendered, calculates a set of values (e.g. red, green, blue, z, alpha, and/or depth of field information) for each of these samples based on their respective positions within the polygon For example, the z value of a sample that falls within a triangle may be interpolated from the known z values of the three vertices. Each set of computed sample values are stored into sample buffer 162.

In one embodiment, sample position memory 354 is embodied within rendering units 150A–D. In another embodiment, sample position memory 354 may be realized as part of memories 152A–152D, or as a separate memory.

Sample position memory 354 may store sample positions in terms of their virtual screen coordinates (X,Y). Alternatively, sample position memory 354 may be configured to store only offsets dX and dY for the samples with respect to positions on a regular grid. Storing only the offsets may use less storage space than storing the entire coordinates (X,Y) for each sample. The sample position information stored in sample position memory 354 may be read by a dedicated sample position calculation unit (not shown) and processed to calculate sample positions for graphics processing unit 90. More detailed information on the computation of sample positions is included below (see description of FIGS. 9 and 10).

In another embodiment, sample position memory 354 may be configured to store a table of random numbers. Sample position memory 354 may also comprise dedicated hardware to generate one or more different types of regular grids. This hardware may be programmable. The stored random numbers may be added as offsets to the regular grid positions generated by the hardware. In one embodiment, sample position memory 354 may be programmable to access or "unfold" the random number table in a number of different ways, and thus, may deliver more apparent randomness for a given length of the random number table. Thus, a smaller table may be used without generating the visual artifacts caused by simple repetition of sample position offsets.

Sample-to-pixel calculation process 360 uses the same sample positions as draw process 352. Thus, in one embodiment, sample position memory 354 may generate a sequence of random offsets to compute sample positions for draw process 352, and may subsequently regenerate the same sequence of random offsets to compute the same sample positions for sample-to-pixel calculation process 360. In other words, the unfolding of the random number table may be repeatable. Thus, it may not be necessary to store sample positions at the time of their generation for draw process 352.

As shown in FIG. 6, sample position memory 354 may be configured to store sample offsets generated according to a number of different schemes such as a regular square grid, a regular hexagonal grid, a perturbed regular grid, or a random (stochastic) distribution. Graphics system 112 may receive an indication from the operating system, device driver, or the geometry data 350 that indicates which type of sample positioning scheme is to be used. Thus the sample position memory 354 is configurable or programmable to generate position information according to one or more different schemes. More detailed information on several sample positioning schemes are described further below (see description of FIG. 8).

In one embodiment, sample position memory 354 may comprise a RAM/ROM that contains stochastically determined sample points or sample offsets. Thus, the density of samples in virtual screen space may not be uniform when observed at small scale. Two bins with equal area centered at different locations in virtual screen space may contain different numbers of samples. As used herein, the term "bin" refers to a region or area in virtual screen space.

An array of bins may be superimposed over virtual screen space, i.e. the 2-D viewport, and the storage of samples in sample buffer 162 may be organized in terms of bins. The sample buffer 162 may comprise an array of memory blocks which correspond to the bins. Each memory block may store the sample values (e.g. red, green, blue, z, alpha, etc.) for the samples that fall within the corresponding bin. The approximate location of a sample is given by the bin in which it resides. The memory blocks may have addresses which are easily computable from the corresponding bin locations in virtual screen space, and vice versa. Thus, the use of bins may simplify the storage and access of sample values in sample buffer 162.

The bins may tile the 2-D viewport in a regular array, e.g. in a square array, rectangular array, triangular array, hexagonal array, etc., or in an irregular array. Bins may occur in a variety of sizes and shapes. The sizes and shapes may be programmable. The maximum number of samples that may populate a bin is determined by the storage space allocated to the corresponding memory block. This maximum number of samples is referred to herein as the bin sample capacity, or simply, the bin capacity. The bin capacity may take any of a variety of values. The bin capacity value may be programmable. Henceforth, the memory blocks in sample buffer 162 which correspond to the bins in virtual screen space will be referred to as memory bins.

The specific position of each sample within a bin may be determined by looking up the sample's offset in the RAM/ROM table, i.e. the sample's offset with respect to the bin position (e.g. the lower-left corner or center of the bin, etc.). However, depending upon the implementation, not all choices for the bin capacity may have a unique set of offsets stored in the RAM/ROM table. Offsets for a first bin capacity value may be determined by accessing a subset of the offsets stored for a second larger bin capacity value. In one embodiment, each bin capacity value supports at least four different sample positioning schemes. The use of different sample positioning schemes may reduce final image artifacts due to repeating sample positions.

In one embodiment, sample position memory 354 may store pairs of 8-bit numbers, each pair comprising an x-offset and a y-offset. (Other offsets are also possible, e.g., a time offset, a z-offset, etc.) When added to a bin position, each pair defines a particular position in virtual screen space, i.e. the 2-D viewport. To improve read access times, sample position memory 354 may be constructed in a wide/parallel manner so as to allow the memory to output more than one sample location per read cycle.

Once the sample positions have been read from sample position memory 354, draw process 352 selects the samples that fall within the polygon currently being rendered. Draw process 352 then calculates the z and color information (which may include alpha or other depth of field information values) for each of these samples and stores the data into sample buffer 162. In one embodiment, sample buffer 162 may only single-buffer z values (and perhaps alpha values) while double-buffering other sample components such as color. Unlike prior art systems, graphics system 112 may use double-buffering for all samples (although not all components of samples may be double-buffered, i.e., the samples may have some components that are not double-buffered). In one embodiment, the samples are stored into sample buffer 162 in bins. In some embodiments, the bin capacity may vary from frame to frame. In addition, the bin capacity may vary spatially for bins within a single frame rendered into sample buffer 162. For example, bins on the edge of the 2-D viewport may have a smaller bin capacity than bins corresponding to the center of the 2-D viewport. Since viewers are likely to focus their attention mostly on the center of the screen SCR or display image DIM, more processing bandwidth may be dedicated to providing enhanced image quality in the center of 2-D viewport. Note that the size and shape of bins may also vary from region to region, or from frame to frame. The use of bins will be described in greater detail below.

In parallel and independently of draw process 352, filter process 360 is configured to: (a) read sample positions from sample position memory 354, (b) read corresponding sample values from sample buffer 162, (c) filter the sample values, and (d) output the resulting output pixel values to one or more of projection devices $PD_1$ through $PD_L$ and/or display device 84. Sample-to-pixel calculation units 170 implement filter process 360. Filter process 360 is operable to generate the red, green, and blue values for an output pixel based a spatial filtering of the corresponding data for a selected plurality of samples, e.g. samples falling in a neighborhood of the pixel center. Other values such as alpha may also be generated. In one embodiment, filter process 360 is configured to: (i) determine the distance of each sample from the pixel center; (ii) multiply each sample's attribute values (e.g., red, green, blue, alpha) by a filter weight that is a specific (programmable) function of the sample's distance; (iii) generate sums of the weighted attribute values, one sum per attribute (e.g. a sum for red, a sum for green, etc.), and (iv) normalize the sums to generate the corresponding pixel attribute values. Filter process 360 is described in greater detail below (see description accompanying FIGS. 11, 12, and 14).

In the embodiment just described, the filter kernel is a function of distance from the pixel center, and thus, is radially symmetric. However, in alternative embodiments, the filter kernel may be a more general function of X and Y displacements from the pixel center. Thus, the support of the filter, i.e. the 2-D neighborhood over which the filter kernel takes non-zero values, may not be a circular disk. Any sample falling within the support of the filter kernel may affect the output pixel being computed.

Figure 7:
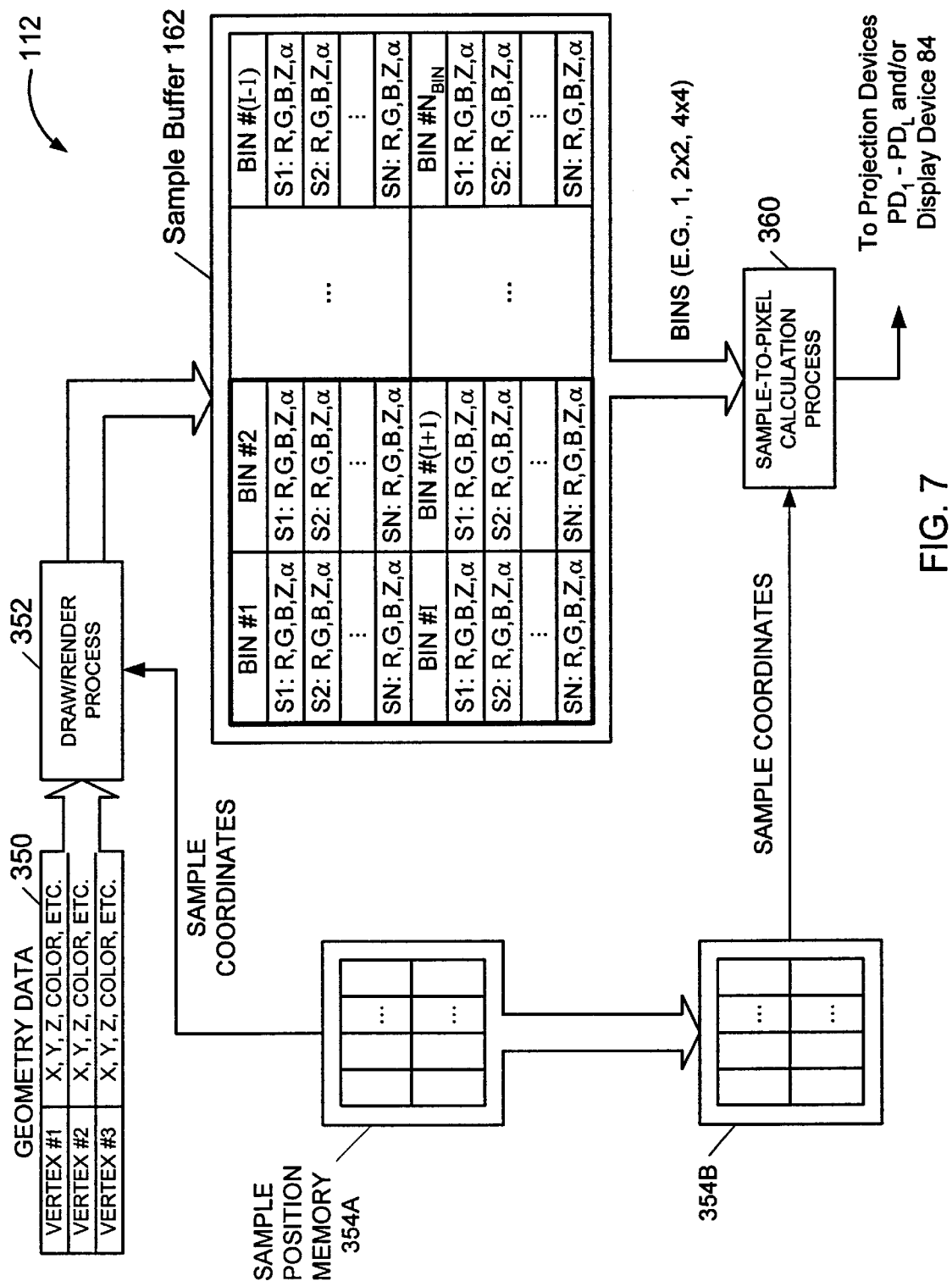
FIG. 7 illustrates details of another embodiment of a graphics system having one embodiment of a variable resolution super-sampled sample buffer and a double buffered sample position memory.

Turning now to FIG. 7, a diagram illustrating an alternate embodiment of graphics system 112 is shown. In this embodiment, two or more sample position memories 354A and 354B are utilized. Thus, the sample position memories 354A–B are essentially double-buffered. If the sample positions remain the same from frame to frame, then the sample positions may be single-buffered. However, if the sample positions vary from frame to frame, then graphics system 112 may be advantageously configured to double-buffer the sample positions. The sample positions may be double-buffered on the rendering side (i.e., memory 354A may be double-buffered) and/or the filter side (i.e., memory 354B may be double-buffered). Other combinations are also possible. For example, memory 354A may be single-buffered, while memory 354B is doubled-buffered. This configuration may allow one side of memory 354B to be updated by draw process 352 while the other side of memory 354B is accessed by filter process 360. In this configuration, graphics system 112 may change sample positioning schemes on a per-frame basis by shifting the sample positions (or offsets) from memory 354A to double-buffered memory 354B as each frame is rendered. Thus, the sample positions which are stored in memory 354A and used by draw process 352 to render sample values may be copied to memory 354B for use by filter process 360. Once the sample position information has been copied to memory 354B, position memory 354A may then be loaded with new sample positions (or offsets) to be used for a second frame to be rendered. In this way the sample position information follows the sample values from the draw 352 process to the filter process 360.

Yet another alternative embodiment may store tags to offsets with the sample values in super-sampled sample buffer 162. These tags may be used to look-up the offset (i.e. perturbations) dX and dY associated with each particular sample.

Sample Positioning Schemes

Figure 8:
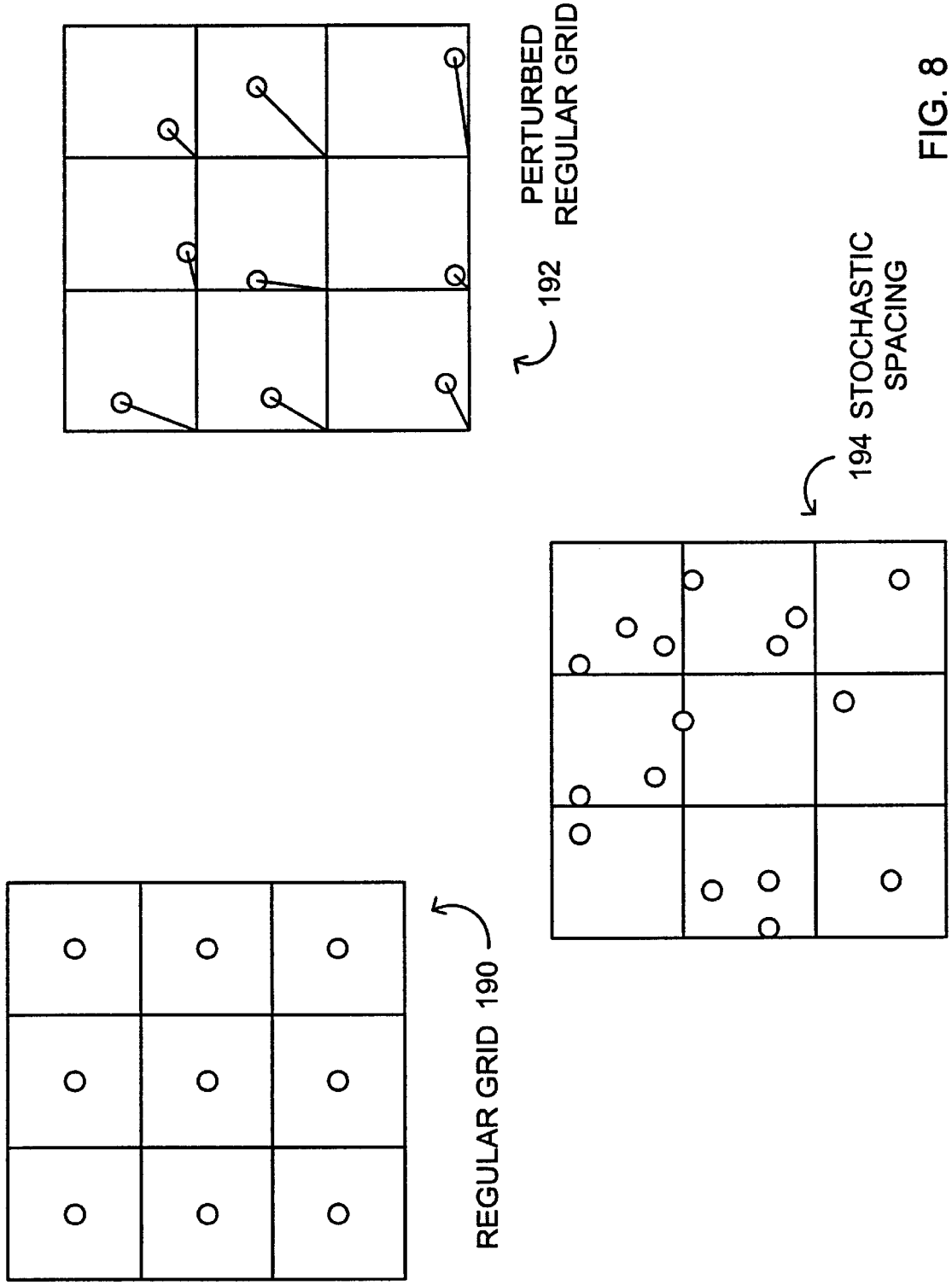
FIG. 8 illustrates details of three different embodiments of sample positioning schemes.

FIG. 8 illustrates a number of different sample positioning schemes. In the regular positioning scheme 190, samples are positioned at fixed positions with respect to a regular grid which is superimposed on the 2-D viewport. For example, samples may be positioned at the center of the rectangles which are generated by the regular grid. More generally, any tiling of the 2-D viewport may generate a regular positioning scheme. For example, the 2-D viewport may be tiled with triangles, and thus, samples may be positioned at the centers (or vertices) of the triangular tiles. Hexagonal tilings, logarithmic tilings, and semi-regular tilings such as Penrose tilings are also contemplated.

In the perturbed regular positioning scheme 192, sample positions are defined in terms of perturbations from a set of fixed positions on a regular grid or tiling. In one embodiment, the samples may be displaced from their corresponding fixed grid positions by random x and y offsets, or by random angles (ranging from 0 to 360 degrees) and random radii (ranging from zero to a maximum radius). The offsets may be generated in a number of ways, e.g. by hardware based upon a small number of seeds, by reading a table of stored offsets, or by using a pseudo-random function. Once again, perturbed regular gird scheme 192 may be based on any type of regular grid or tiling. Samples generated by perturbation with respect to a grid (e.g., hexagonal tiling may particularly desirable due to the geometric properties of this configuration).

Stochastic sample positioning scheme 194 represents a third potential type of scheme for positioning samples. Stochastic sample positioning involves randomly distributing the samples across the 2-D viewport. Random positioning of samples may be accomplished through a number of different methods, e.g., using a random number generator such as an internal clock to generate pseudo-random numbers. Random numbers or positions may also be pre-calculated and stored in memory. Note, as used in this application, random positions may be selected from a statistical population (e.g., a Poisson-disk distribution). Different types of random and pseudo-random positions are described in greater detail in Chapter 10 of Volume 1 of the treatise titled "Principles of Digital Image Synthesis" by Andrew S. Glassner, Morgan Kaufman Publishers 1995.

Figure 9:
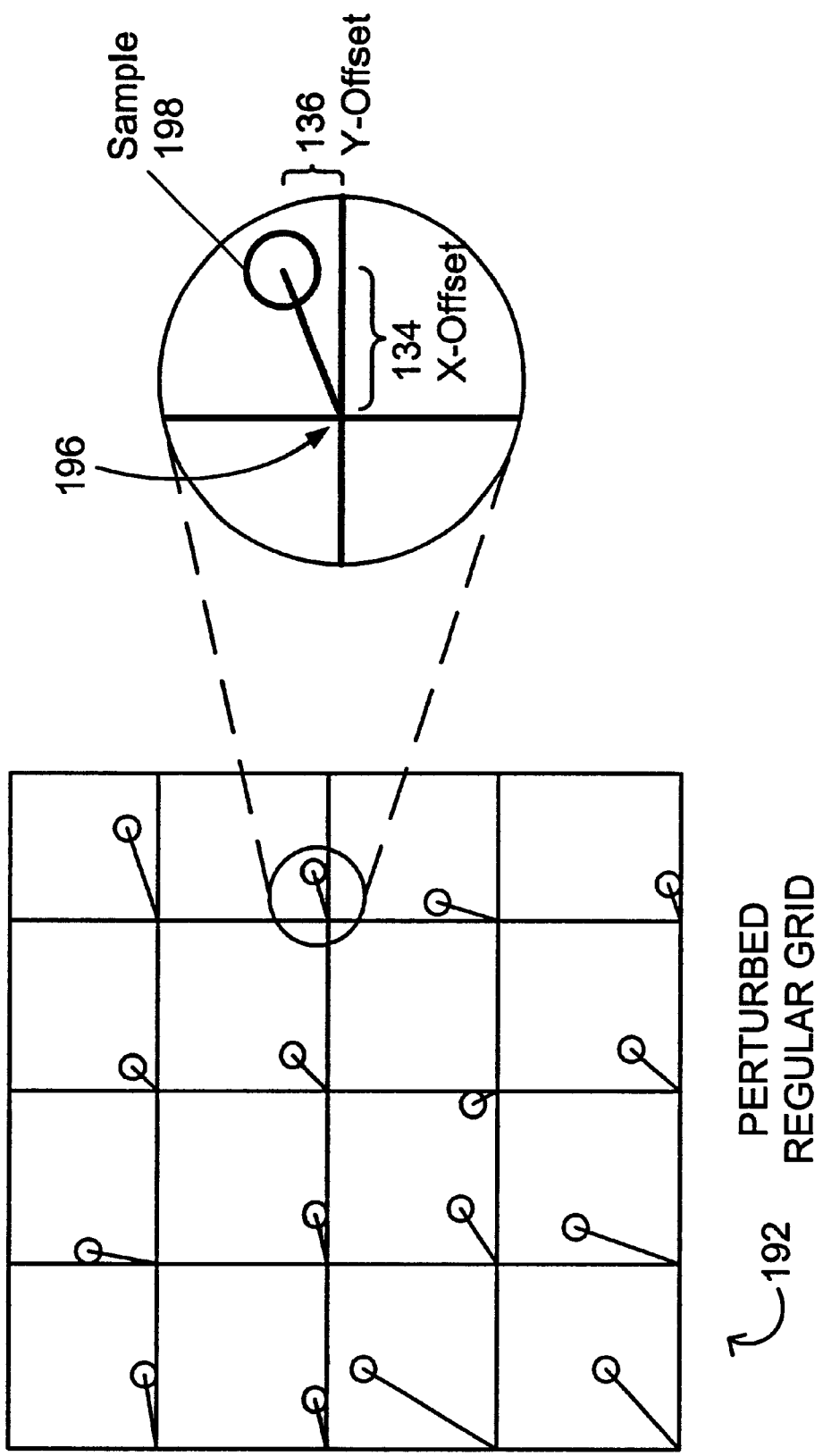
FIG. 9 illustrates details of one embodiment of a sample positioning scheme.

Turning now to FIG. 9, details of one embodiment of perturbed regular positioning scheme 192 are shown. In this embodiment, samples are randomly offset from a regular square grid by x- and y-offsets. As the enlarged area shows, sample 198 has an x-offset 134 that specifies its horizontal displacement from its corresponding grid intersection point 196. Similarly, sample 198 also has a y-offset 136 that specifies its vertical displacement from grid intersection point 196. The random x-offset 134 and y-offset 136 may be limited to a particular range of values. For example, the x-offset may be limited to the range from zero to $X_{max}$ where $X_{max}$ is the width of the a grid rectangle. Similarly, the y-offset may be limited to the range from zero to $Y_{max}$ may $Y_{max}$ is the height of a grid rectangle. The random offset may also be specified by an angle and radius with respect to the grid intersection point 196.

Figure 10:
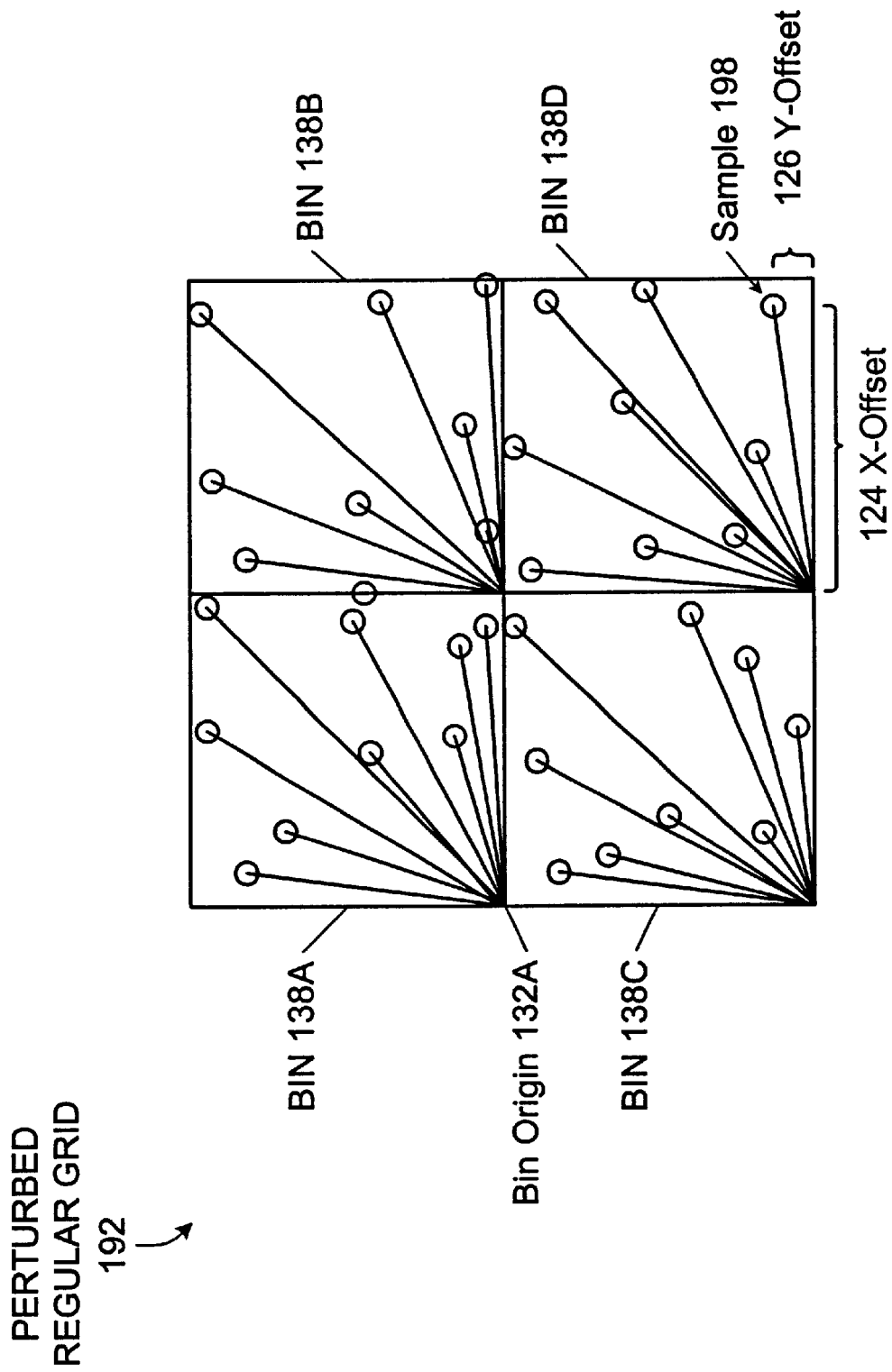
FIG. 10 illustrates details of another embodiment of a sample positioning scheme.

FIG. 10 illustrates details of another embodiment of the perturbed regular grid scheme 192. In this embodiment, the samples are grouped into rectangular bins 138A–D. In this embodiment, each bin comprises nine samples, i.e. has a bin capacity of nine. Different bin capacities may be used in other embodiments (e.g., bins storing four samples, 16 samples, etc.). Each sample's position may be determined by an x- and y-offset relative to the origin of the bin in which it resides. The origin of a bin may be chosen to be the lower-left corner of the bin (or any other convenient location within the bin). For example, the position of sample 198 is determined by summing x-offset 124 and y-offset 126 respectively to the x and y coordinates of the origin 132D of bin 138D. As previously noted, this may reduce the size of sample position memory 354 used in some embodiments.

FIG. 11—Converting Samples into Pixels

As discussed earlier, the 2-D viewport may be covered with an array of spatial bins. Each spatial bin may be populated with samples whose positions are determined by sample position memory 354. Each spatial bin corresponds to a memory bin in sample buffer 162. A memory bin stores the sample values (e.g. red, green, blue, z, alpha, etc.) for the samples that reside in the corresponding spatial bin. Sample-to-pixel calculation units 170 (also referred to as convolve units 170) are configured to read memory bins from sample buffer 162 and to convert sample values contained within the memory bins into pixel values.

Figure 11A:
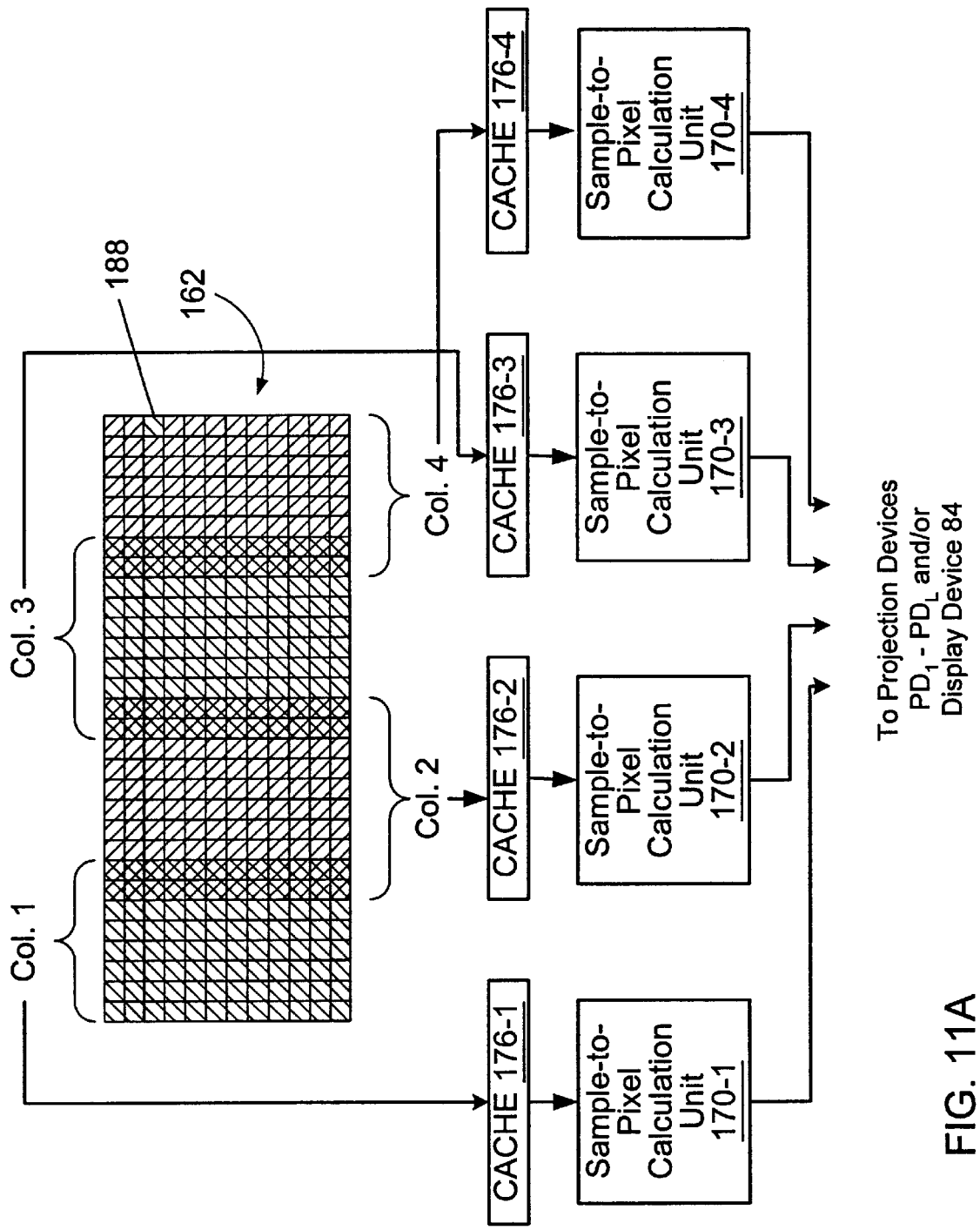
FIG. 11A illustrates details of one embodiment of a graphics system configured to convert samples to pixels in parallel using vertical screen stripes (columns)
Figure 11B:
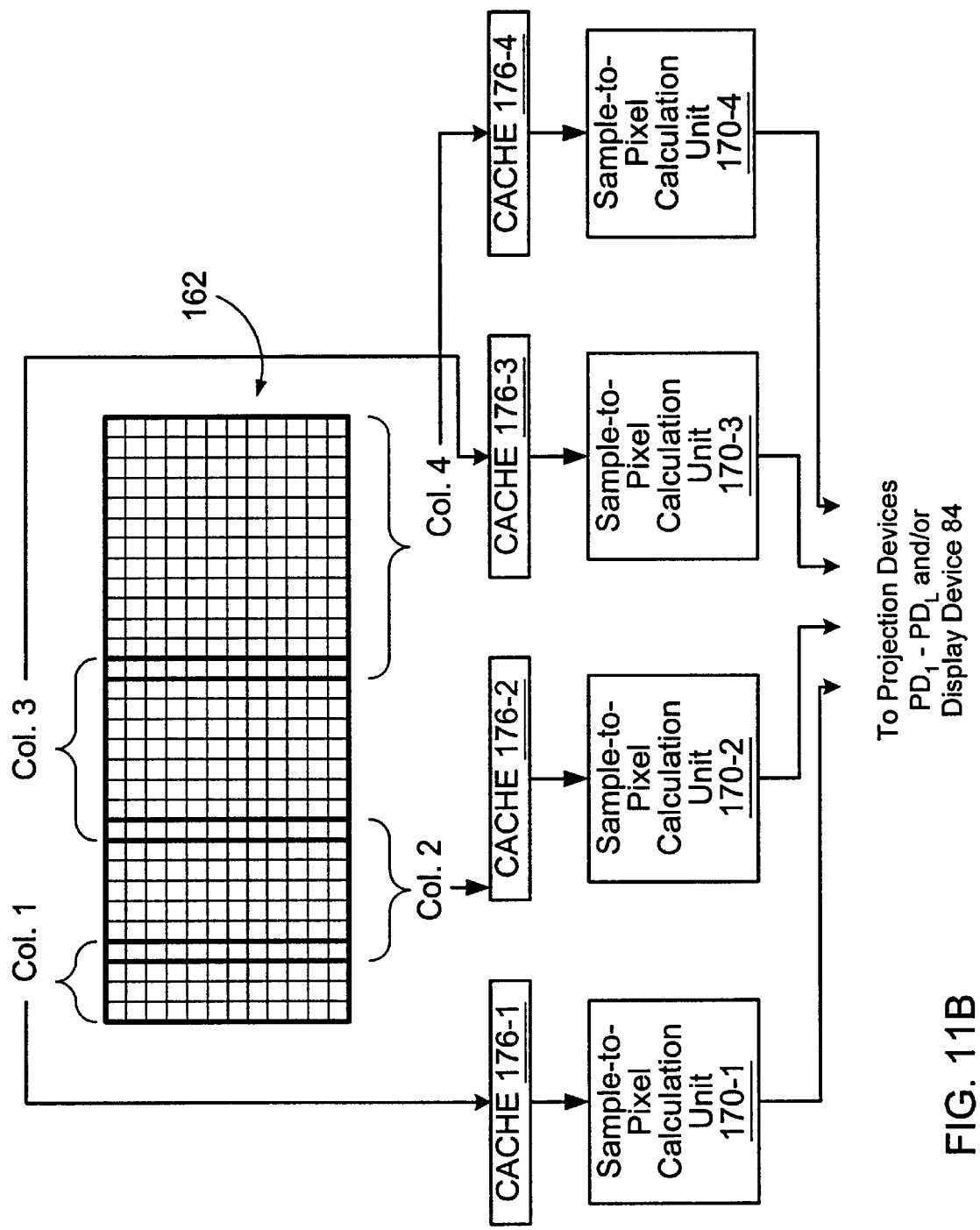
FIG. 11B illustrates details of another embodiment of a graphics system configured to convert samples to pixels in parallel using vertical screen stripes (columns)

Parallel Sample-to-Pixel Filtering using Columns—
FIGS. 11A–11B

FIG. 11A illustrates one method for rapidly converting sample values stored in sample buffer 162 into pixel values. The spatial bins which cover the 2-D viewport may be organized into columns (e.g., Cols. 1–4). Each column comprises a two-dimensional sub-array of spatial bins. The columns may be configured to horizontally overlap (e.g., by one or more bins). Each of the sample-to-pixel calculation units 170-1 through 170-4 may be configured to access memory bins corresponding to one of the columns. For example, sample-to-pixel calculation unit 170-1 may be configured to access memory bins that correspond to the spatial bins of Column 1. The data pathways between sample buffer 162 and sample-to-pixel calculations unit 170 may be optimized to support this column-wise correspondence.

The amount of the overlap between columns may depend upon the horizontal diameter of the filter support for the filter kernel being used. The example shown in FIG. 11A illustrates an overlap of two bins. Each square (such as square 188) represents a single bin comprising one or more samples. Advantageously, this configuration may allow sample-to-pixel calculation units 170 to work independently and in parallel, with each of the sample-to-pixel calculation units 170 receiving and convolving samples residing in the memory bins of the corresponding column. Overlapping the columns will prevent visual bands or other artifacts from appearing at the column boundaries for any operators larger than a pixel in extent.

Furthermore, the embodiment of FIG. 11A includes a plurality of bin caches 176 which couple to sample buffer 162. In addition, each of bin caches 176 couples to a corresponding one of sample-to-pixel calculation units 170. Generic bin cache 176-I (where I takes any value positive integer value) stores a collection of memory bins corresponding to Column I and serves as a cache for sample-to-pixel calculation unit 170-I. Generic bin cache 176-I may have an optimized coupling to sample buffer 162 which facilitates access to the memory bins for Column I. Since the sample-to-pixel calculation for two adjacent output pixels may involve many of the same bins, bin caches 176 may increase the overall access bandwidth to sample buffer 162. Sample-to-bin calculation units 170 may be implemented in a number of different ways, including using high performance ALU (arithmetic logic unit) cores, functional units from a microprocessor or DSP, or a custom design that uses hardware multipliers and adders.

Turning now to FIG. 11B, another method for performing parallel sample-to-pixel calculation is shown. In this embodiment, sample buffer 162 is divided into a plurality of vertical columns or stripes as in the previously described embodiment. However, the columns in this embodiment are not of equal size or width. For example, column one may contain significantly fewer bins of samples than column four. This embodiment may be particularly useful in configurations of the graphics system that support variable sample densities. As previously noted and as described in greater detail below, the graphics system may devote more samples (i.e., a higher sample density) for areas of sample buffer 162 that correspond to areas of the final image that would benefit the most from higher sample densities, e.g., areas of particular interest to the viewer or areas of the image that correspond to the viewer's point of foveation (described in greater detail below). In these systems that support variable sample densities, the ability to vary the widths of the columns may advantageously allow the graphics system to equalize the number of samples filtered by each of the sample-to-pixel calculation units. For example, column one may correspond to a portion of the displayed image upon which the center of the viewers view point is focused. Thus, the graphics system may devote a high density of samples to the bins in column one, and the graphics system may devote a lower density of samples to the bins in column four. Thus, by decreasing the width of column one and increasing the width of column four, sample-to-pixel calculation units 170-1 and 170-4 may each filter approximately the same number of samples. Advantageously, balancing the filtering load among the sample-to-pixel calculation units may allow the graphics system to use the processing resources of the sample-to-pixel calculation units in a more efficient manner.

In some embodiments, the graphics system may be configured to dynamically change the widths of the columns on a frame by frame basis (or even on a fraction of a frame basis). In embodiments of the graphics system that change sample densities dynamically (e.g., eye-tracking, point of foveation tracking, main character tracking), the sample densities may vary on a frame by frame basis, thus varying the column width on a frame by frame basis once again allows the computing resources of sample-to-pixel calculation units 170 to be utilized in a more efficient manner. In some embodiments, the column width may be varied on a scan line basis or some other time-basis. In addition to varying with time, as the figure illustrates the columns may also be configured to overlap (as in the previously described embodiment) to prevent the appearance of any visual artifacts (e.g., seams, tears, or vertical lines).

Figure 12:
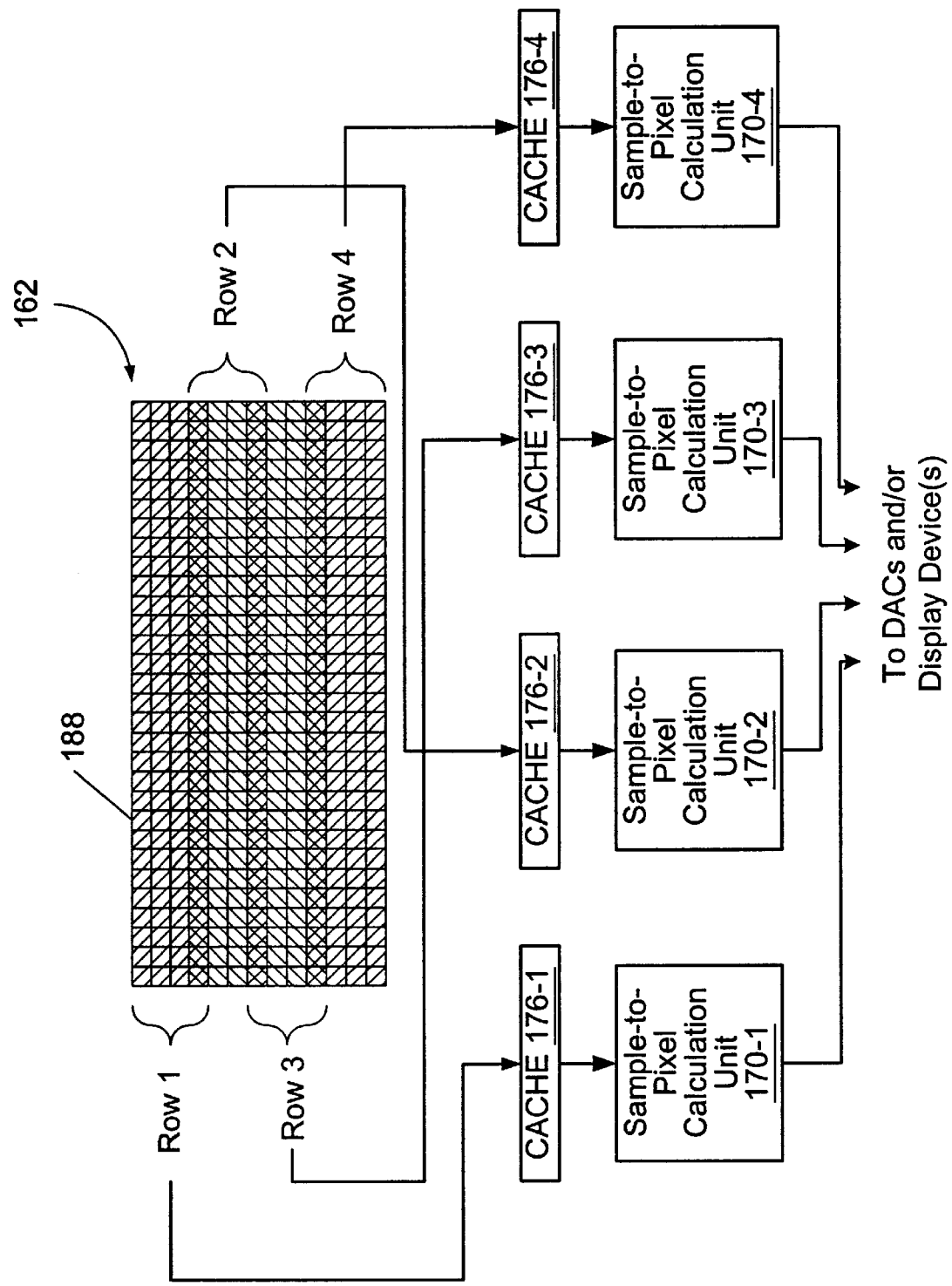
FIG. 12 illustrates details of another embodiment of a graphics system configured to convert samples to pixels in parallel using horizontal screen stripes (rows)

Parallel Sample-to-Pixel Filtering using Rows—
FIG. 12

Turning now to FIG. 12, another embodiment of the graphics system is shown. In this embodiment, sample buffer 162 is divided into a plurality of horizontal rows or stripes. As with the previous embodiments, the rows may overlap and/or vary in width to compensate for varying sample densities. As with the previous embodiment, each row may provide bins (and samples) to a particular bin cache 176 and corresponding sample-to-pixel calculation unit 170. Parallel Sample-to-Pixel Filtering using Rows—FIG. 13

Figure 13:
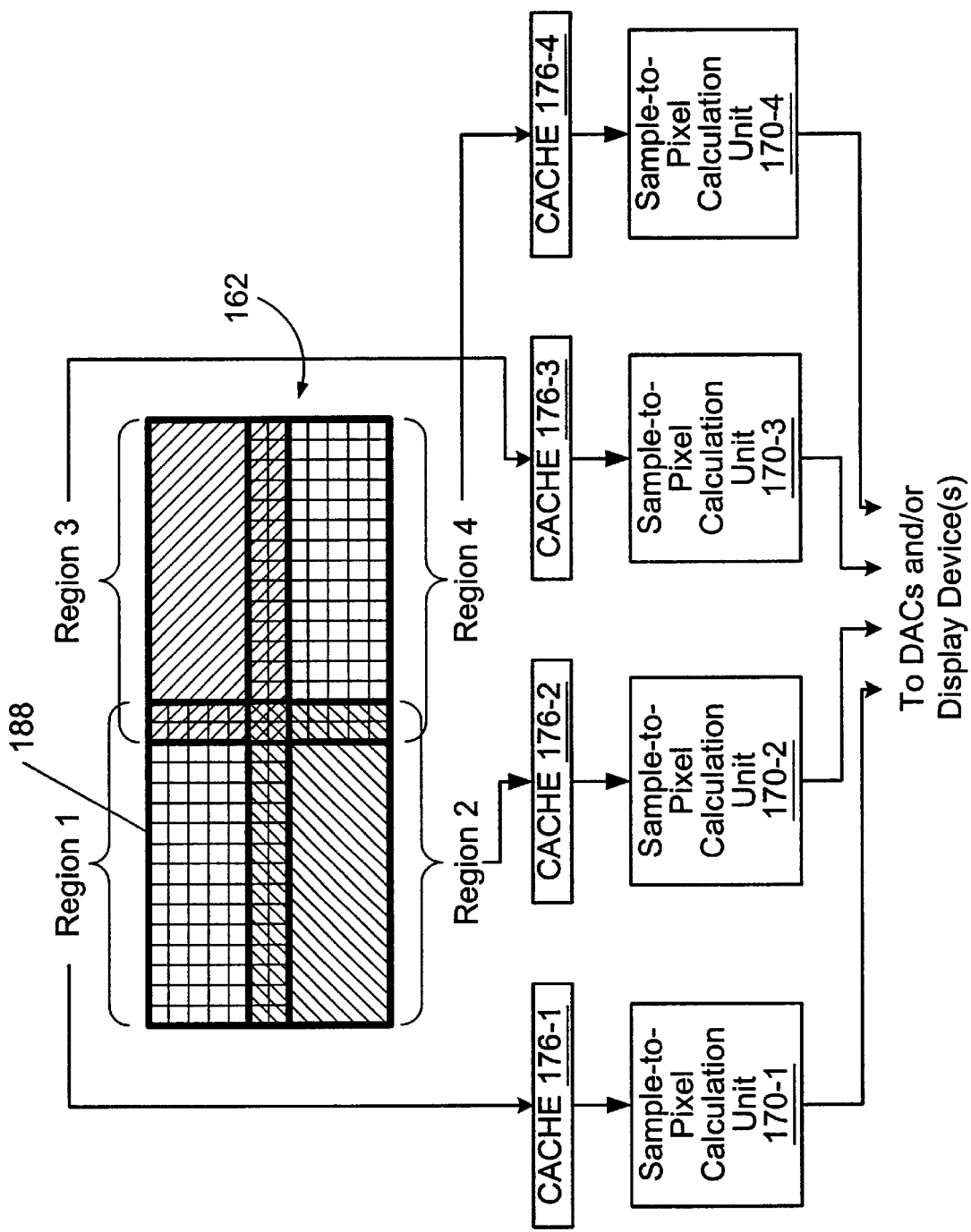
FIG. 13 illustrates details of another embodiment of a graphics system configured to convert samples to pixels in parallel using rectangular regions.

Turning now to FIG. 13, yet another embodiment of the graphics system is shown. In this embodiment, sample buffer 162 is divided into a plurality of rectangular regions. As with the previous embodiments, the rectangular regions may or may not overlap, have different sizes, and/or dynamically vary in size (e.g., on a frame by frame or scan line basis). Each region may be configured to provide bins (and samples) to a particular bin cache 176 and corresponding sample-to-pixel calculation unit 170. In some embodiments, each rectangular region may correspond to the image projected by one of a plurality of projectors (e.g., LCD projectors). In other embodiments, each rectangular region may correspond to a particular portion of a single image projected or displayed on a single display device. As with the previous embodiments, advantageously, the sample-to-pixel calculation units 170 may be configured to operate independently and in parallel, thereby reducing the graphics systems' latency. As previously noted, the rectangular regions illustrated in FIG. 13 need not be of uniform size and/or shape.

In embodiments of the graphics system that have varying region sizes or stripe widths, the amount of overlap may also vary dynamically on a frame by frame or sub-frame basis. Note, other shapes for the regions into which sample buffer 162 may be divided are possible and contemplated. For example, in some embodiments each sample-to-pixel calculation unit may receive bins (and samples) from multiple small regions or stripes.

In some embodiments, sample caches 176 may not have enough storage space to store an entire horizontal scan line. For this reason dividing the sample buffer into regions may be useful. Depending on the display device, the regions may be portions of odd only and even only scan lines. In some systems, e.g. those with multiple display devices, each region may correspond to a single display device or to a quadrant of an image being displayed. For example, assuming the images formed by four projectors are tiled together to form a single, large image, then each sample-to-pixel calculation unit could receive samples corresponding to pixels displayed by a particular projector. In some embodiments, the overlapping areas of the regions may be stored twice, thereby allowing each sample-to-pixel calculation unit exclusive access to a particular region of the sample buffer. This may prevent timing problems that result when two different sample-to-pixel calculation units (or two sample cache controllers) attempt to access the same set of memory locations at the same time. In other embodiments the sample buffer may be multi-ported to allow one or more multiple concurrent accesses to the same memory locations.

As previously noted, in some embodiments the sample caches are configured to read samples from the sample buffer. In some embodiments, the samples may be read on a bin-by-bin basis from the sample buffer. The sample cache and/or sample buffer may include control logic that is configured to ensure that all samples that have a potential to contribute to one or more pixels that are being filtered (or that are about to be filtered) are available for the corresponding sample-to-pixel calculation unit. In some implementations, the sample caches may be large enough to store a predetermined array of bins such as 5×5 bins (e.g., to match the maximum filter size). In another embodiment, instead of a 5×5 bin cache, the sample caches may be configured to output pixels as they are being accumulated to a series of multiple accumulators. In this embodiment, a different coefficient is generated for each pixel, depending upon the number of samples and their weightings.

Figure 14:
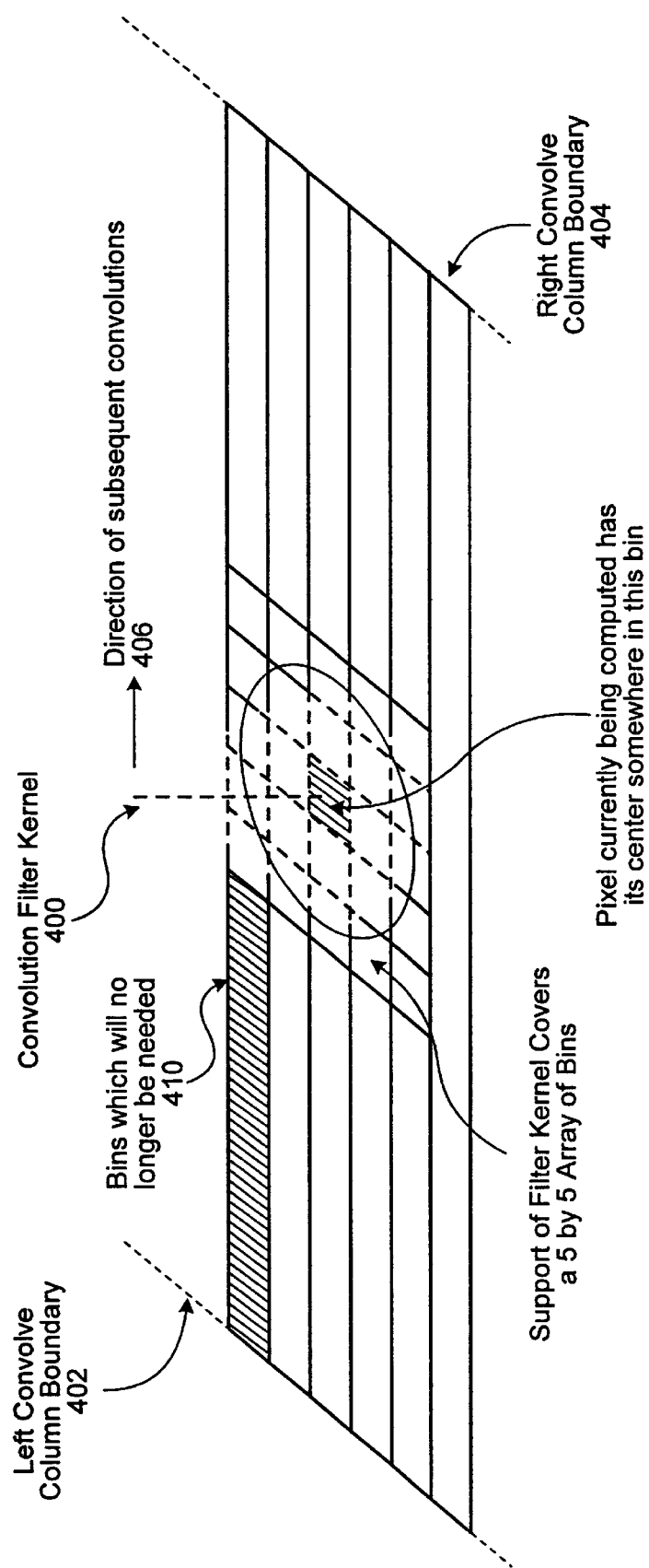
FIG. 14 illustrates details of one method for reading samples from a sample buffer.

Method for Reading Samples from Sample Buffer—FIG. 14

Turning now to FIG. 14, more details of one embodiment of a method for reading sample values from a super-sampled sample buffer are shown. As the figure illustrates, the sample-to-pixel filter kernel 400 travels across Column I (in the direction of arrow 406) to generate output pixel values, where index I takes any value in the range from one to four. Sample-to-pixel calculation unit 170-I may implement the sample-to-pixel filter kernel 400. Bin cache 176-I may used to provide fast access to the memory bins corresponding to Column I. For example, bin cache 176-I may have a capacity greater than or equal to 25 memory bins since the support of sample-to-pixel filter kernel 400 covers a 5 by 5 array of spatial bins. As the sample-to-pixel operation proceeds, memory bins are read from the super-sampled sample buffer 162 and stored in bin cache 176-I. In one embodiment, bins that are no longer needed, e.g. bins 410, are overwritten in bin cache 176-I by new bins. As each output pixel is generated, sample-to-pixel filter kernel 400 shifts. Kernel 400 may be visualized as proceeding in a sequential fashion within Column I in the direction indicated by arrow 406. When kernel 400 reaches the right boundary 404 of the Column I, it may shift down one or more rows of bins, and then, proceed horizontally starting from the left column boundary 402. Thus the sample-to-pixel operation proceeds in a scan line manner generating successive rows of output pixels for display.

Figure 15:
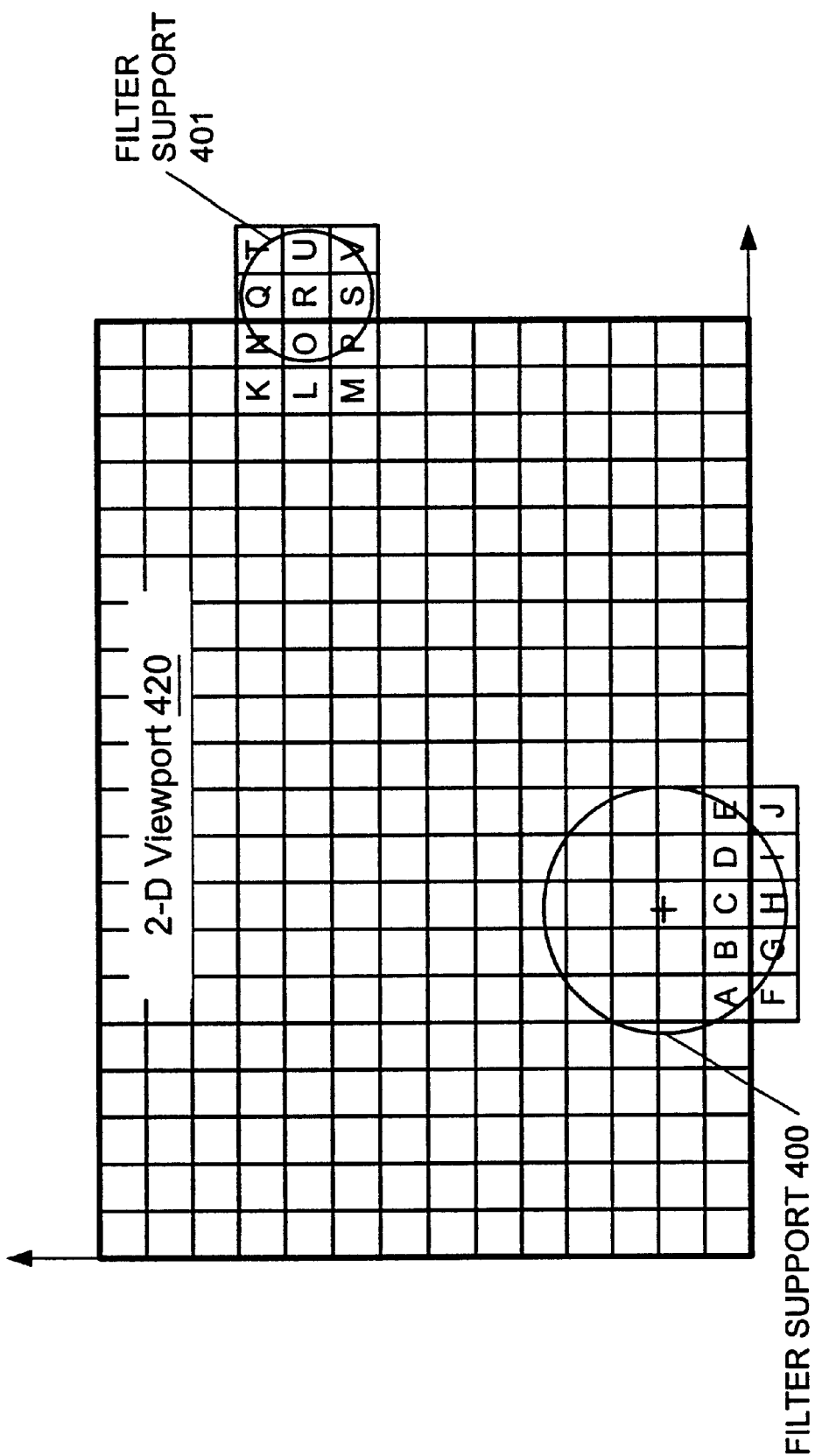
FIG. 15 illustrates details of one embodiment of a method for dealing with boundary conditions.

FIG. 15 illustrates potential border conditions in the computation of output pixel values. The 2-D viewport 420 is illustrated as a rectangle which is overlaid with a rectangular array of spatial bins. Recall that every spatial bin corresponds to a memory bin in sample buffer 162. The memory bin stores the sample values and/or sample positions for samples residing in the corresponding spatial bin. As described above, sample-to-pixel calculation units 170 filter samples in the neighborhood of a pixel center in order to generate output pixel values (e.g. red, green, blue, etc.). Pixel center $PC_0$ is close enough to the lower boundary (Y=0) of the 2-D viewport 420 that its filter support 400 is not entirely contained in the 2-D viewport. Sample-to-pixel calculation units 170 may generate sample positions and/or sample values for the marginal portion of filter support 400 (i.e. the portion which falls outside the 2-D viewport 420) according to a variety of methods.

In one embodiment, sample-to-pixel calculation units 170 may generate one or more dummy bins to cover the marginal area of the filter support 400. Sample positions for the dummy bins may be generated by reflecting the sample positions of spatial bins across the 2-D viewport boundary. For example, dummy bins F, G, H, I and J may be assigned sample positions by reflecting the sample positions corresponding to spatial bins A, B, C, D, and E respectively, across the boundary line Y=0. Predetermined color values may be associated with these dummy samples in the dummy bins. For example, the value (0,0,0) for the RGB color vector may be assigned to each dummy sample. As pixel center $PC_0$ moves downward (i.e. toward the boundary Y=0 and through it), additional dummy bins with dummy samples may be generated to cover filter support 400 (which moves along with the pixel center $PC_0$. The number of dummy samples falling within filter support 400 increases and reaches a maximum when filter support 400 has moved entirely outside of the 2-D viewport 420. Thus, the color value computed based on filter support 400 approaches the predetermined background color as the pixel center $PC_0$ crosses the boundary.

A pixel center may lie outside of the 2-D viewport 420, and yet, may be close enough to the viewport boundary so that part of its filter support lies in the 2-D viewport 420. Filter support 401 corresponds to one such pixel center. Sample-to-pixel calculation units 170 may generate dummy bins Q, R, S, T, U and V to cover the external portion of filter support 401 (i.e. the portion external to the 2-D viewport). The dummy bins Q, R and S may be assigned sample positions based on the sample positions of spatial bins N, O and P, and/or spatial bins K, L and M.

The sample positions for dummy bins may also be generated by translating the sample positions corresponding to spatial bins across the viewport boundary, or perhaps, by generating sample positions on-the-fly according to a regular, a perturbed regular or stochastic sample positioning scheme.

Figure 16:
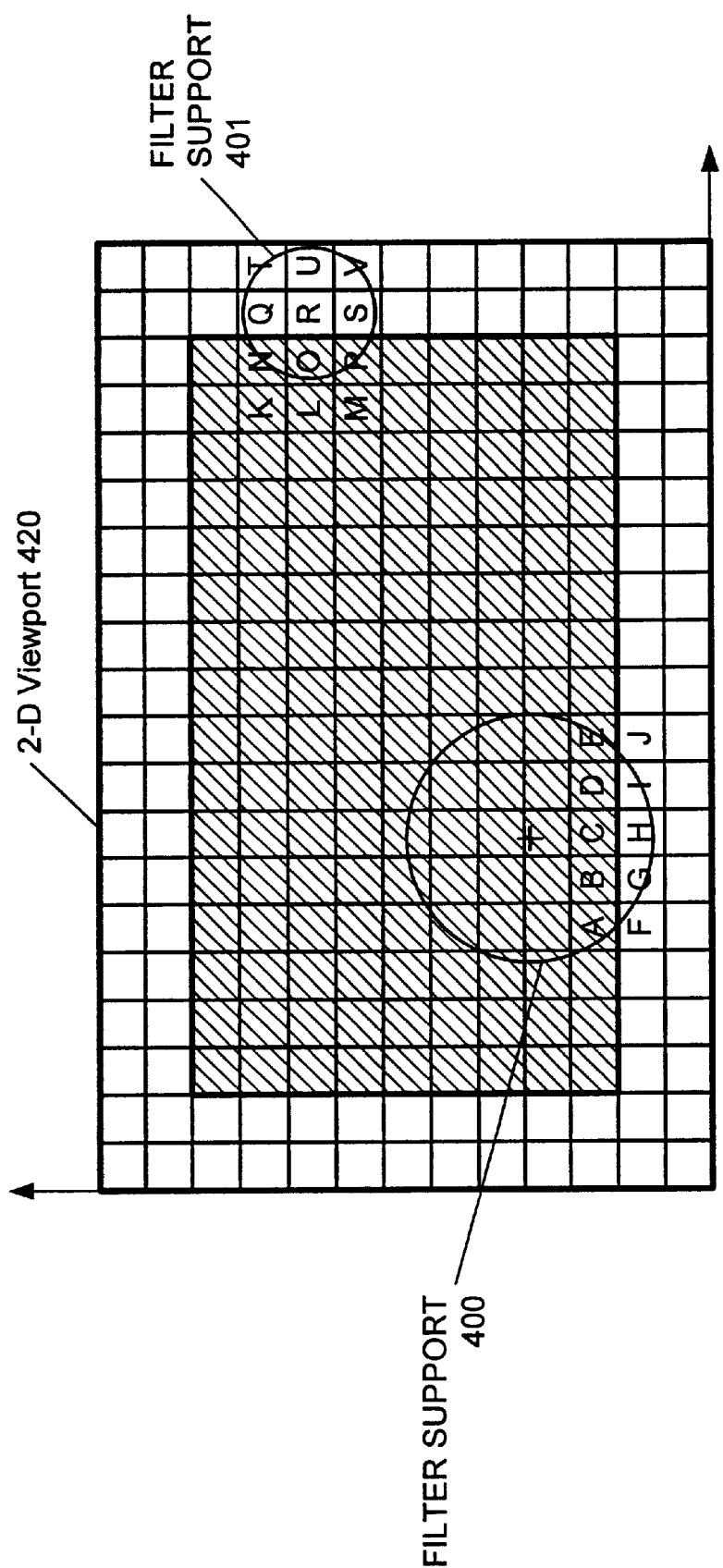
FIG. 16 illustrates details of another embodiment of a method for dealing with boundary conditions.

FIG. 16 illustrates an alternate embodiment of a method for performing pixel value computations. Sample-to-pixel computation units 170 may perform pixel value computations using a viewable subwindow 422 of the 2-D viewport 420. The viewable subwindow is depicted as a rectangle with lower left corner at $(X_1,Y_1)$ and upper right corner at $(X_2,Y_2)$ in virtual screen space. Note, in some embodiments the filter may be auto-normalized or pre-normalized to reduce the number of calculations required for determining the final pixel value.

Figure 17:
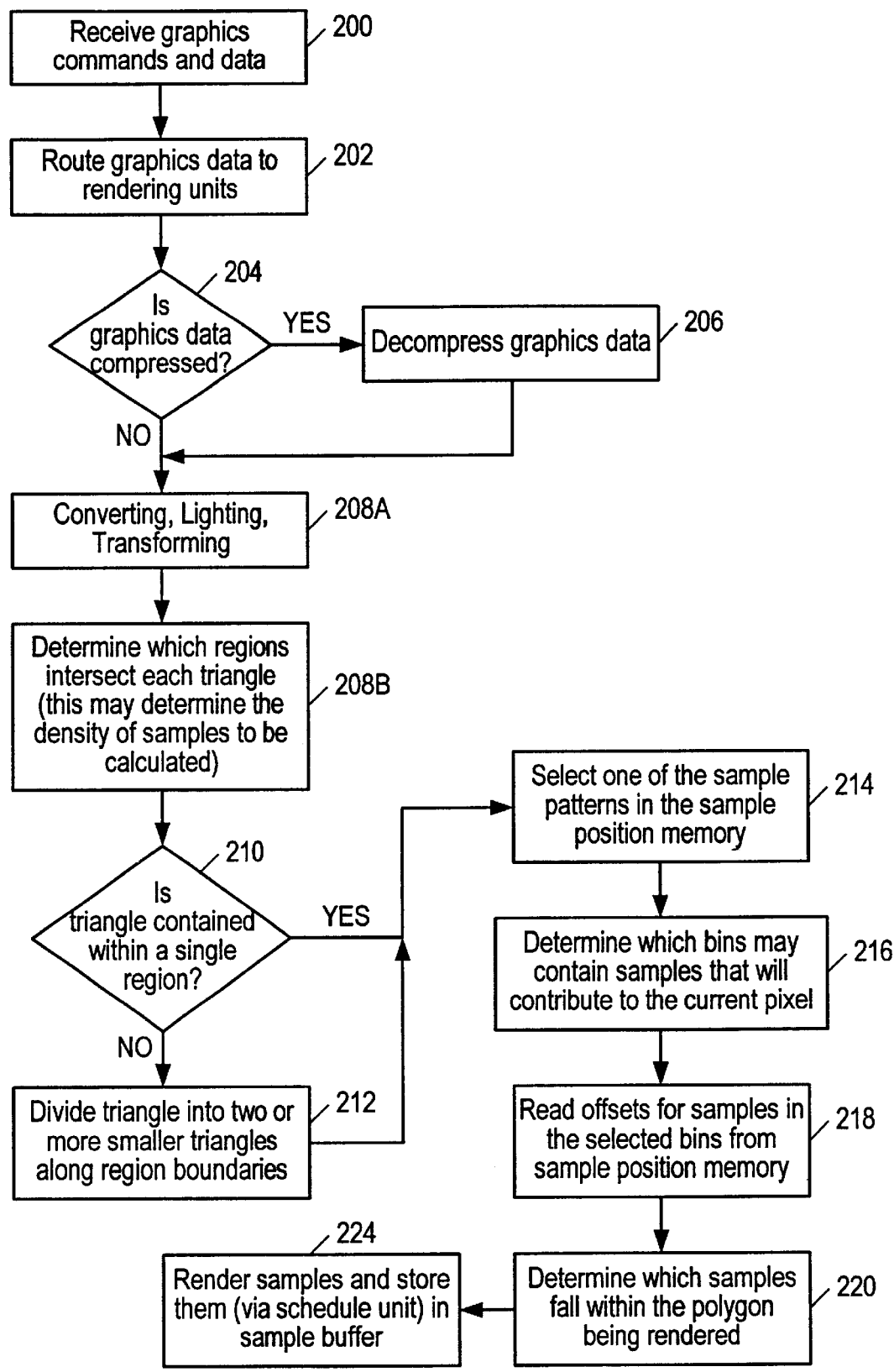
FIG. 17 is a flowchart illustrating one embodiment of a method for drawing samples into a super-sampled sample buffer.

Rendering Samples into a Super-Sampled Sample Buffer—FIG. 17

FIG. 17 is a flowchart of one embodiment of a method for drawing or rendering samples into a super-sampled sample buffer. Certain of the steps of FIG. 17 may occur concurrently or in different orders. In step 200, graphics system 112 receives graphics commands and graphics data from the host CPU 102 or directly from system memory 106. In step 202, the instructions and data are routed to one or more of rendering units 150A–D. In step 204, rendering units 150A–D determine if the graphics data is compressed. If the graphics data is compressed, rendering units 150A–D decompress the graphics data into a useable format, e.g., triangles, as shown in step 206. Next, the triangles are processed, e.g., converted from model space to world space, lit, and transformed (step 208A).

If the graphics system implements variable resolution super-sampling, then the triangles are compared with a set of sample-density region boundaries (step 208B). In variable-resolution super-sampling, different regions of the 2-D viewport may be allocated different sample densities based upon a number of factors (e.g., the center of the attention of an observer on projection screen SCR as determined by eye or head tracking). Sample density regions are described in greater detail below (see section entitled Variable Resolution Sample Buffer below). If the triangle crosses a sample-density region boundary (step 210), then the triangle may be divided into two smaller polygons along the region boundary (step 212). The polygons may be further subdivided into triangles if necessary (since the generic slicing of a triangle gives a triangle and a quadrilateral). Thus, each newly formed triangle may be assigned a single sample density. In one embodiment, graphics system 112 may be configured to render the original triangle twice, i.e. once with each sample density, and then, to clip the two versions to fit into the two respective sample density regions.

In step 214, one of the sample positioning schemes (e.g., regular, perturbed regular, or stochastic) is selected from sample position memory 354. The sample positioning scheme will generally have been pre-programmed into the sample position memory 354, but may also be selected "on the fly". In step 216, rendering units 150A–D determine which spatial bins may contain samples located within the triangle's boundaries, based upon the selected sample positioning scheme and the size and shape of the spatial bins. In step 218, the offsets dX and dY for the samples within these spatial bins are then read from sample position memory 354. In step 220, each sample's position is then calculated using the offsets dX and dY and the coordinates of the corresponding bin origin, and is compared with the triangle's vertices to determine if the sample is within the triangle. Step 220 is discussed in greater detail below.

For each sample that is determined to be within the triangle, the rendering unit draws the sample by calculating the sample's color, alpha and other attributes. This may involve a lighting calculation and an interpolation based upon the color and texture map information associated with the vertices of the triangle. Once the sample is rendered, it may be forwarded to schedule unit 154, which then stores the sample in sample buffer 162 (step 224).

Note the embodiment of the rendering method described above is used for explanatory purposes only and is not meant to be limiting. For example, in some embodiments, the steps shown in FIG. 13 as occurring serially may be implemented in parallel. Furthermore, some steps may be reduced or eliminated in certain embodiments of the graphics system (e.g., steps 204–206 in embodiments that do not implement geometry compression, or steps 210–212 in embodiments that do not implement a variable resolution super-sampled sample buffer).

Figure 18:
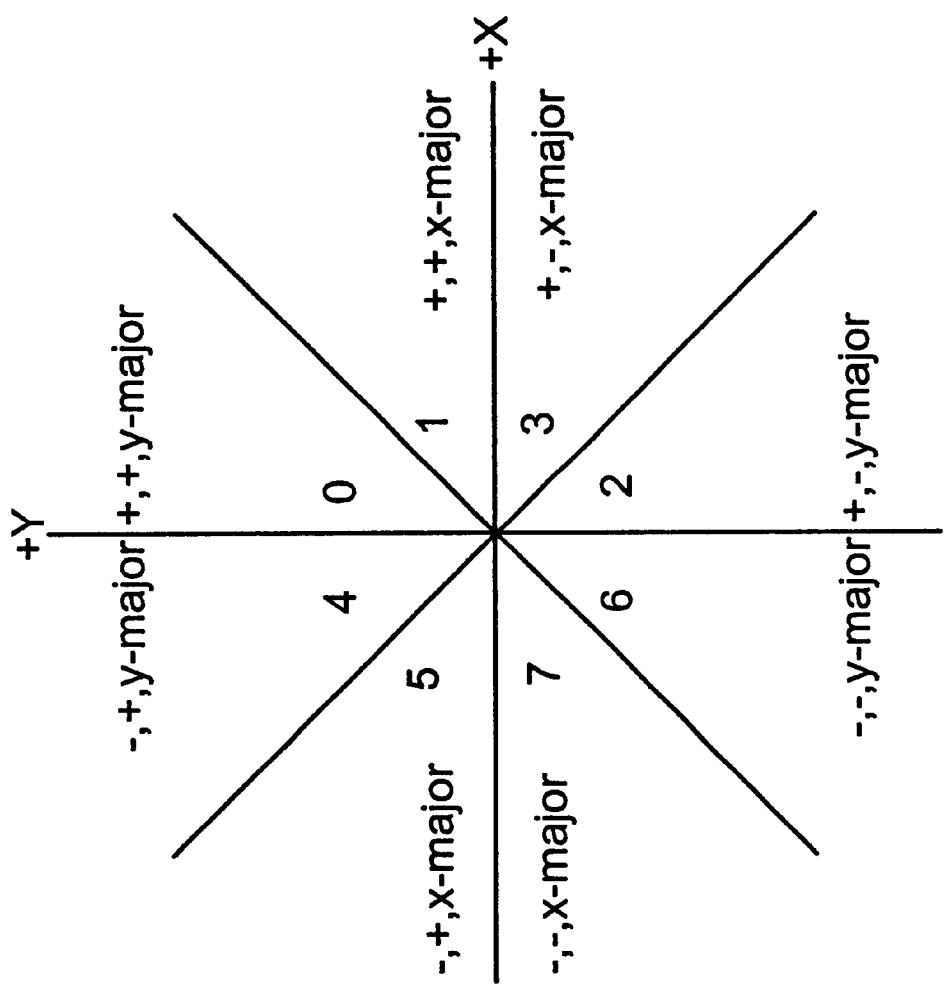
FIG. 18 illustrates one embodiment of a method for coding triangle vertices.

Determination of Which Samples are in Polygon Being Rendered—FIG. 18

The determination of which samples reside within the polygon being rendered may be performed in a number of different ways. In one embodiment, the deltas between the three vertices defining the triangle are first determined. For example, these deltas may be taken in the order of first to second vertex (v2 v1)=d12, second to third vertex (v3−v2)=d23, and third vertex back to the first vertex (v1−v3)=d31. These deltas form vectors, and each vector may be categorized as belonging to one of the four quadrants of the coordinate plane (e.g., by using the two sign bits of its delta X and Y components). A third condition may be added determining whether the vector is an X-major vector or Y-major vector. This may be determined by calculating whether abs(delta_x) is greater than abs(delta_y). Using these three bits of information, the vectors may each be categorized as belonging to one of eight different regions of the coordinate plane. If three bits are used to define these regions, then the X-sign bit (shifted left by two), the Y-sign bit (shifted left by one), and the X-major bit, may be used to create the eight regions as shown in FIG. 18.

Next, three edge inequalities may be used to define the interior of the triangle. The edges themselves may be described as lines in the either (or both) of the forms y=mx+b or x=ry+c, where rm=1. To reduce the numerical range needed to express the slope, either the X-major and Y-major equation form for an edge equation may be used (so that the absolute value of the slope may be in the range of 0 to 1). Thus, the edge (or half-plane) inequalities may be expressed in either of two corresponding forms:

X-major: $y-m \cdot x-b<0$, when point (x,y) is below the edge;

Y-major: $x-r \cdot y-c<0$, when point (x,y) is to the left of the edge.

The X-major inequality produces a logical true value (i.e. sign bit equal to one) when the point in question (x,y) is below the line defined by the an edge. The Y-major equation produces a logical true value when the point in question (x,y) is to the left of the line defined by an edge. The side which comprises the interior of the triangle is known for each of the linear inequalities, and may be specified by a Boolean variable referred to herein as the accept bit. Thus, a sample (x,y) is on the interior side of an edge if X-major: $(y-m \cdot x-b<0 \texttt{<xor>} \text{accept}=\text{true}$;

Y-major: $(y-m \cdot x-b<0 \texttt{<xor>} \text{accept}=\text{true}$;

The accept bit for a given edge may be calculated according to the following table based on (a) the region (zero through seven) in which the edge delta vector resides, and (b) the sense of edge traversal, where clockwise traversal is indicated by cw=1 and counter-clockwise traversal is indicated by cw=0. The notation "!" denotes the logical complement.

1: accept=!cw
0: accept=cw
4: accept=cw
5: accept=cw
7: accept=cw
6: accept=!cw
2: accept=!cw
3: accept=!cw Tie breaking rules for this representation may also be implemented (e.g., coordinate axes may be defined as belonging to the positive octant). Similarly, X-major may be defined as owning all points that tie on the slopes.

In an alternate embodiment, the accept side of an edge may be determined by applying the edge inequality to the third vertex of the triangle (i.e. the vertex that is not one of the two vertices forming the edge). This method may incur the additional cost of a multiply-add, which may be avoided by the technique described above.

To determine the "faced-ness" of a triangle (i.e., whether the triangle is clockwise or counter-clockwise), the delta-directions of two edges of the triangle may be checked and the slopes of the two edges may be compared. For example, assuming that edge12 has a delta-direction of 1 and the second edge (edge23) has a delta-direction of 0, 4, or 5, then the triangle is counter-clockwise. If, however, edge23 has a delta-direction of 3, 2, or 6, then the triangle is clockwise. If edge23 has a delta-direction of 1 (i.e., the same as edge12), then comparing the slopes of the two edges breaks the tie (both are x-major). If edge12 has a greater slope, then the triangle is clockwise. If edge23 has a delta-direction of 7 (the exact opposite of edge12), then again the slopes are compared, but with opposite results in terms of whether the triangle is clockwise or counter-clockwise.

The same analysis can be exhaustively applied to all combinations of edge12 and edge23 delta-directions, in every case determining the proper faced-ness. If the slopes are the same in the tie case, then the triangle is degenerate (i.e., with no interior area). It can be explicitly tested for and culled, or, with proper numerical care, it could be let through as it will cause no samples to render. One special case arises when a triangle splits the view plane. However, this case may be detected earlier in the pipeline (e.g., when front plane and back plane clipping are performed).

Note in most cases only one side of a triangle is rendered. Thus, if the faced-ness of a triangle determined by the analysis above is the one to be rejected, then the triangle can be culled (i.e., subject to no further processing with no samples generated). Further note that this determination of faced-ness only uses one additional comparison (i.e., of the slope of edge12 to that of edge23) beyond factors already computed. Many traditional approaches may utilize more complex computations (though at earlier stages of the set-up computation).

Figure 19:
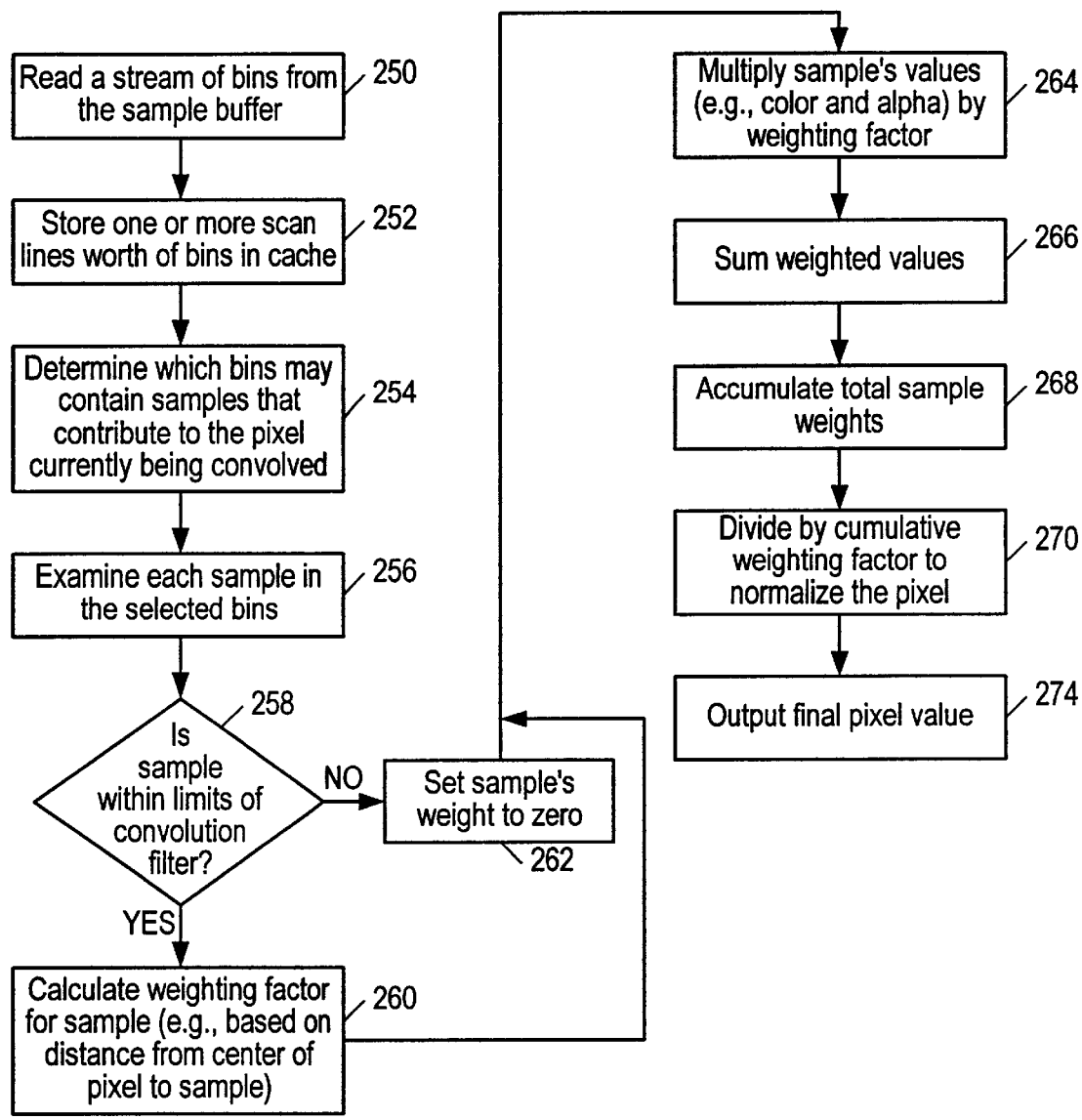
FIG. 19 illustrates one embodiment of a method for calculating pixels from samples.

Generating Output Pixels Values from Sample Values—FIG. 19

FIG. 19 is a flowchart of one embodiment of a method for selecting and filtering samples stored in super-sampled sample buffer 162 to generate output pixel values. In step 250, a stream of memory bins are read from the super-sampled sample buffer 162. In step 252, these memory bins may be stored in one or more of bin caches 176 to allow the sample-to-pixel calculation units 170 easy access to sample values during the sample-to-pixel operation. In step 254, the memory bins are examined to determine which of the memory bins may contain samples that contribute to the output pixel value currently being generated. Each sample that is in a bin that may contribute to the output pixel is then individually examined to determine if the sample does indeed contribute (steps 256–258). This determination may be based upon the distance from the sample to the center of the output pixel being generated.

In one embodiment, the sample-to-pixel calculation units 170 may be configured to calculate this distance (i.e., the extent or envelope of the filter at the sample's position) and then use it to index into a table storing filter weight values according to filter extent (step 260). In another embodiment, however, the potentially expensive calculation for determining the distance from the center of the pixel to the sample (which typically involves a square root function) is avoided by using distance squared to index into the table of filter weights. Alternatively, a function of x and y may be used in lieu of one dependent upon a distance calculation. In one embodiment, this may be accomplished by utilizing a floating point format for the distance (e.g., four or five bits of mantissa and three bits of exponent), thereby allowing much of the accuracy to be maintained while compensating for the increased range in values. In one embodiment, the table may be implemented in ROM. However, RAM tables may also be used. Advantageously, RAM tables may, in some embodiments, allow the graphics system to vary the filter coefficients on a per-frame basis. For example, the filter coefficients may be varied to compensate for known shortcomings of the display or for the user's personal preferences. In some embodiments, the use of RAM tables may allow the user to select different filters (e.g., via a sharpness control on the display device or in a window system control panel). A number of different filters may be implemented to generate desired levels of sharpness based on different display types. For example, the control panel may have one setting optimized of LCD displays and another setting optimized for CRT displays. The graphics system can also vary the filter coefficients on a screen area basis within a frame, or on a per-output pixel basis. Another alternative embodiment may actually calculate the desired filter weights for each sample using specialized hardware (e.g., multipliers and adders). The filter weight for samples outside the limits of the sample-to-pixel filter may simply be multiplied by a filter weight of zero (step 262), or they may be removed from the calculation entirely.

Once the filter weight for a sample has been determined, the sample may then be multiplied by its filter weight (step 264). The weighted sample may then be summed with a running total to determine the final output pixel's color value (step 266). The filter weight may also be added to a running total pixel filter weight (step 268), which is used to normalize the filtered pixels. Normalization advantageously prevents the filtered pixels (e.g., pixels with more samples than other pixels) from appearing too bright or too dark by compensating for gain introduced by the sample-to-pixel calculation process. After all the contributing samples have been weighted and summed, the total pixel filter weight may be used to divide out the gain caused by the filtering (step 270). Finally, the normalized output pixel may be output and/or processed through one or more of the following processes (not necessarily in this order): gamma correction, color look-up using pseudo color tables, direct color, inverse gamma correction, programmable gamma encoding, color space conversion, and digital-to-analog conversion, before eventually being displayed (step 274).

In some embodiments, the graphics system may be configured to use each sample's alpha information to generate a mask that output with the sample. The mask may be used to perform real-time soft-edged blue screen effects. For example, the mask may be used to indicate which portions of the rendered image should be masked (and how much). This mask could be used by the graphics system or external hardware to blend the rendered image with another image (e.g., a signal from a video camera) to create a blue screen effect that is smooth (anti-aliased with respect to the overlapping regions of the two images) or a ghost effect (e.g., superimposing a partially transparent object smoothly over another object, scene, or video stream).

Example Output Pixel Calculation—FIG. 20

FIG. 20 illustrates a simplified example of an output pixel convolution. As the figure shows, four bins 288A–D contain samples that may possibly contribute to the output pixel. In this example, the center of the output pixel is located at the boundary of bins 288A–288D. Each bin comprises sixteen samples, and an array of four bins (2×2) is filtered to generate the output pixel. Assuming circular filters are used, the distance of each sample from the pixel center determines which filter value will be applied to the sample. For example, sample 296 is relatively close to the pixel center, and thus falls within the region of the filter having a filter value of 8. Similarly, samples 294 and 292 fall within the regions of the filter having filter values of 4 and 2, respectively. Sample 290, however, falls outside the maximum filter extent, and thus receives a filter value of 0. Thus sample 290 will not contribute to the output pixel's value. This type of filter ensures that the samples located the closest to the pixel center will contribute the most, while pixels located farther from the pixel center will contribute less to the final output pixel values. This type of filtering automatically performs anti-aliasing by smoothing any abrupt changes in the image (e.g., from a dark line to a light background). Another particularly useful type of filter for anti-aliasing is a windowed sinc filter. Advantageously, the windowed sinc filter contains negative lobes that resharpen some of the blended or "fuzzed" image. Negative lobes are areas where the filter causes the samples to subtract from the pixel being calculated. In contrast samples on either side of the negative lobe add to the pixel being calculated.

Example values for samples 290–296 are illustrated in boxes 300–308. In this example, each sample comprises red, green, blue and alpha values, in addition to the sample's positional data. Block 310 illustrates the calculation of each pixel component value for the non-normalized output pixel. As block 310 indicates, potentially undesirable gain is introduced into the final pixel values (i.e., an output pixel having a red component value of 2000 is much higher than any of the sample's red component values). As previously noted, the filter values may be summed to obtain normalization value 308. Normalization value 308 is used to divide out the unwanted gain from the output pixel. Block 312 illustrates this process and the final normalized example pixel values.

Note the values used herein were chosen for descriptive purposes only and are not meant to be limiting. For example, the filter may have a large number of regions each with a different filter value. In one embodiment, some regions may have negative filter values. The filter utilized may be a continuous function that is evaluated for each sample based on the sample's distance from the pixel center. Also note that floating point values may be used for increased precision. A variety of filters may be utilized, e.g., box, tent, cylinder, cone, Gaussian, Catmull-Rom, Mitchell and Netravalli, windowed sinc, etc.

It is also noted that the filter weights need not be powers of two as show in the figure. The example in the figure is simplified for explanatory purposes. A table of filter weights may be used (e.g., having a large number of entries which are indexed in to based on the distance of the sample from the pixel or filter center). Furthermore, in some embodiments each sample in each bin may be summed to form the pixel value (although some samples within the bins may have a weighting of zero and thus nevertheless contribute nothing to the final pixel value).

Full-Screen Anti-aliasing

The vast majority of current 3D graphics systems only provide real-time anti-aliasing for lines and dots. While some systems also allow the edge of a polygon to be "fuzzed", this technique typically works best when all polygons have been pre-sorted in depth. This may defeat the purpose of having general-purpose 3D rendering hardware for most applications (which do not depth pre-sort their polygons). In one embodiment, graphics system 112 may be configured to implement full-screen anti-aliasing by stochastically sampling up to sixteen samples per output pixel, filtered by a 5×5-convolution filter.

Variable-Resolution Super Sampling—FIGS. 21–25

Figure 21:
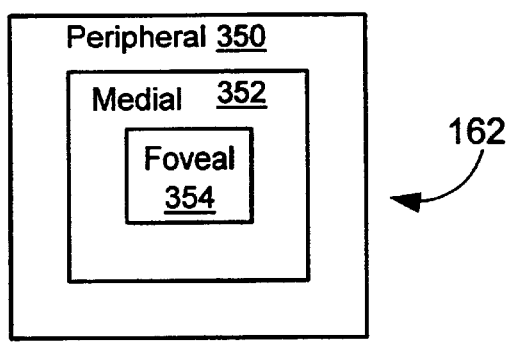
FIG. 21 illustrates one embodiment of a method for varying the density of samples.

Turning now to FIG. 21, a diagram of one possible scheme for dividing sample buffer 162 is shown. In this embodiment, sample buffer 162 is divided into the following three nested regions: foveal region 354, medial region 352, and peripheral region 350. Each of these regions has a rectangular shaped outer border, but the medial and the peripheral regions have a rectangular shaped hole in their center. Each region may be configured with certain constant (per frame) properties, e.g., a constant density sample density and a constant size of pixel bin. In one embodiment, the total density range may be 256, i.e., a region could support between one sample every 16 screen pixels (4×4) and 16 samples for every 1 screen pixel. In other embodiments, the total density range may be limited to other values, e.g., 64. In one embodiment, the sample density varies, either linearly or non-linearly, across a respective region. Note in other embodiments the display may be divided into a plurality of constant sized regions (e.g., squares that are 4×4 pixels in size or 40×40 pixels in size).

To simply perform calculations for polygons that encompass one or more region corners (e.g., a foveal region corner), the sample buffer may be further divided into a plurality of subregions. In FIG. 21, one embodiment of sample buffer 162 divided into sub-regions is shown. Each of these sub-regions are rectangular, allowing graphics system 112 to translate from a 2D address with a sub-region to a linear address in sample buffer 162. Thus, in some embodiments each sub-region has a memory base address, indicating where storage for the pixels within the sub-region starts. Each sub-region may also have a "stride" parameter associated with its width.

Figure 22:
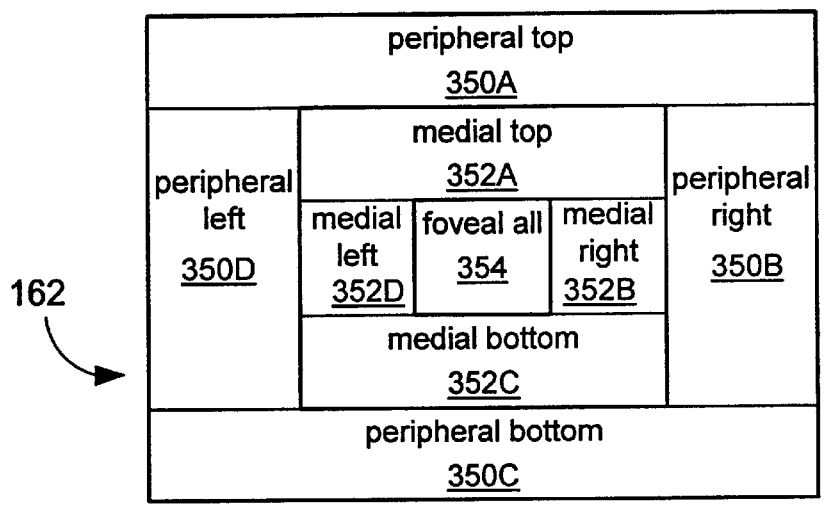
FIG. 22 illustrates another embodiment of a method for varying the density of samples.
Figure 23:
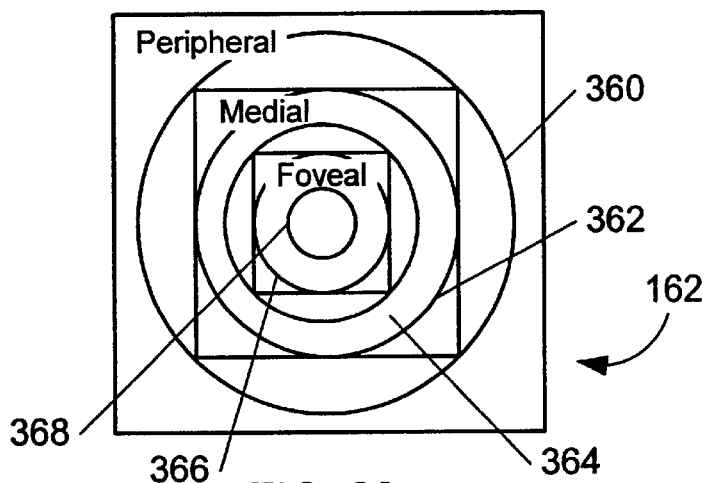
FIG. 23 illustrates yet another embodiment of a method for varying the density of samples.

Another potential division of the super-sampled sample buffer is circular. Turning now to FIG. 22, one such embodiment is illustrated. For example, each region may have two radii associated with it (i.e., 360–368), dividing the region into three concentric circular-regions. The circular-regions may all be centered at the same screen point, the fovea center point. Note however, that the fovea center-point need not always be located at the center of the foveal region. In some instances it may even be located off-screen (i.e., to the side of the visual display surface of the display device). While the embodiment illustrated supports up to seven distinct circular-regions, it is possible for some of the circles to be shared across two different regions, thereby reducing the distinct circular-regions to five or less.

The circular regions may delineate areas of constant sample density actually used. For example, in the example illustrated in the figure, foveal region 354 may allocate a sample buffer density of 8 samples per screen pixel, but outside the innermost circle 368, it may only use 4 samples per pixel, and outside the next circle 366 it may only use two samples per pixel. Thus, in this embodiment the rings need not necessarily save actual memory (the regions do that), but they may potentially save memory bandwidth into and out of the sample buffer (as well as pixel convolution bandwidth). In addition to indicating a different effective sample density, the rings may also be used to indicate a different sample position scheme to be employed. As previously noted, these sample position schemes may stored in an on-chip RAM/ROM, or in programmable memory.

As previously discussed, in some embodiments supersampled sample buffer 162 may be further divided into bins. For example, a bin may store a single sample or an array of samples (e.g., 2×2 or 4×4 samples). In one embodiment, each bin may store between one and sixteen sample points, although other configurations are possible and contemplated. Each region may be configured with a particular bin size, and a constant memory sample density as well. Note that the lower density regions need not necessarily have larger bin sizes. In one embodiment, the regions (or at least the inner regions) are exact integer multiples of the bin size enclosing the region. This may allow for more efficient utilization of the sample buffer in some embodiments.

Variable-resolution super-sampling involves calculating a variable number of samples for each pixel displayed on the display device. Certain areas of an image may benefit from a greater number of samples (e.g., near object edges), while other areas may not need extra samples (e.g., smooth areas having a constant color and brightness). To save memory and bandwidth, extra samples may be used only in areas that may benefit from the increased resolution. For example, if part of the display is colored a constant color of blue (e.g., as in a background), then extra samples may not be particularly useful because they will all simply have the constant value (equal to the background color being displayed). In contrast, if a second area on the screen is displaying a 3D rendered object with complex textures and edges, the use of additional samples may be useful in avoiding certain artifacts such as aliasing. A number of different methods may be used to determine or predict which areas of an image would benefit from higher sample densities. For example, an edge analysis could be performed on the final image, and with that information being used to predict how the sample densities should be distributed. The software application may also be able to indicate which areas of a frame should be allocated higher sample densities.

A number of different methods may be used to implement variable-resolution super sampling. These methods tend to fall into the following two general categories: (1) those methods that concern the draw or rendering process, and (2) those methods that concern the convolution process. For example, samples may be rendered into the super-sampling sample buffer 162 using any of the following methods:

1) a uniform sample density;
2) varying sample density on a per-region basis (e.g., medial, foveal, and peripheral); and
3) varying sample density by changing density on a scan-line basis (or on a small number of scan lines basis).

Varying sample density on a scan-line basis may be accomplished by using a look-up table of densities. For example, the table may specify that the first five pixels of a particular scan line have three samples each, while the next four pixels have two samples each, and so on.

On the convolution side, the following methods are possible:

1) a uniform convolution filter;
2) continuously variable convolution filter; and
3) a convolution filter operating at multiple spatial frequencies.

A uniform convolve filter may, for example, have a constant extent (or number of samples selected) for each pixel calculated. In contrast, a continuously variable convolution filter may gradually change the number of samples used to calculate a pixel. The function may be vary continuously from a maximum at the center of attention to a minimum in peripheral areas.

Different combinations of these methods (both on the rendering side and convolution side) are also possible. For example, a constant sample density may be used on the rendering side, while a continuously variable convolution filter may be used on the samples.

Different methods for determining which areas of the image will be allocated more samples per pixel are also contemplated. In one embodiment, if the image on the screen has a main focal point (e.g., a character like Mario in a computer game), then more samples may be calculated for the area around Mario and fewer samples may be calculated for pixels in other areas (e.g., around the background or near the edges of the screen).

In another embodiment, the viewer's point of foveation may be determined by eye/head/hand-tracking. In head-tracking embodiments, the direction of the viewer's gaze is determined or estimated from the orientation of the viewer's head, which may be measured using a variety of mechanisms. For example, a helmet or visor worn by the viewer (with eye/head tracking) may be used alone or in combination with a hand-tracking mechanism, wand, or eye-tracking sensor to provide orientation information to graphics system 112. Other alternatives include head-tracking using an infrared reflective dot placed on the user's forehead, or using a pair of glasses with head- and or eye-tracking sensors built in. One method for using head- and hand-tracking is disclosed in U.S. Pat. No. 5,446,834 (entitled "Method and Apparatus for High Resolution Virtual Reality Systems Using Head Tracked Display," by Michael Deering, issued Aug. 29, 1995), which is incorporated herein by reference in its entirety. Other methods for head tracking are also possible and contemplated (e.g., infrared sensors, electromagnetic sensors, capacitive sensors, video cameras, sonic and ultrasonic detectors, clothing based sensors, video tracking devices, conductive ink, strain gauges, force-feedback detectors, fiber optic sensors, pneumatic sensors, magnetic tracking devices, and mechanical switches).

As previously noted, eye-tracking may be particularly advantageous when used in conjunction with head-tracking. In eye-tracked embodiments, the direction of the viewer's gaze is measured directly by detecting the orientation of the viewer's eyes in relation to the viewer's head. This information, when combined with other information regarding the position and orientation of the viewer's head in relation to the display device, m ay allow an accurate measurement of viewer's point of foveation (or points of foveation if two eye-tracking sensors are used). One possible method for eye tracking is disclosed in U.S. Pat. No. 5,638,176 (entitled "Inexpensive Interferometric Eye Tracking System"). Other methods for eye tracking are also possible and contemplated (e.g., the methods for head tracking listed above).

Regardless of which method is used, as the viewer's point of foveation changes position, so does the distribution of samples. For example, if the viewer's gaze is focused on the upper left-hand corner of the screen, the pixels corresponding to the upper left-hand corner of the screen may each be allocated eight or sixteen samples, while the pixels in the opposite corner (i.e., the lower right-hand corner of the screen) may be allocated only one or two samples per pixel. Once the viewer's gaze changes, so does the allotment of samples per pixel. When the viewer's gaze moves to the lower right-hand corner of the screen, the pixels in the upper left-hand corner of the screen may be allocated only one or two samples per pixel. Thus the number of samples per pixel may be actively changed for different regions of the screen in relation the viewers point of foveation. Note in some embodiments, multiple users may be each have head/eye/hand tracking mechanisms that provide input to graphics system 112. In these embodiments, there may conceivably be two or more points of foveation on the screen, with corresponding areas of high and low sample densities. As previously noted, these sample densities may affect the render process only, the filter process only, or both processes.

Turning now to FIGS. 24A–B, one embodiment of a method for apportioning the number of samples per pixel is shown. The method apportions the number of samples based on the location of the pixel relative to one or more points of foveation. In FIG. 24A, an eye- or head-tracking device 360 is used to determine the point of foveation 362 (i.e., the focal point of a viewer's gaze). This may be determined by using tracking device 360 to determine the direction that the viewer's eyes (represented as 364 in the figure) are facing. As the figure illustrates, in this embodiment, the pixels are divided into foveal region 354 (which may be centered around the point of foveation 362), medial region 352, and peripheral region 350.

Three sample pixels are indicated in the figure. Sample pixel 374 is located within foveal region 314. Assuming foveal region 314 is configured with bins having eight samples, and assuming the convolution radius for each pixel touches four bins, then a maximum of 32 samples may contribute to each pixel. Sample pixel 372 is located within medial region 352. Assuming medial region 352 is configured with bins having four samples, and assuming the convolution radius for each pixel touches four bins, then a maximum of 16 samples may contribute to each pixel. Sample pixel 370 is located within peripheral region 350. Assuming peripheral region 370 is configured with bins having one sample each, and assuming the convolution radius for each pixel touches one bin, then there is a one sample to pixel correlation for pixels in peripheral region 350. Note these values are merely examples and a different number of regions, samples per bin, and convolution radius may be used.

Turning now to FIG. 24B, the same example is shown, but with a different point of foveation 362. As the figure illustrates, when tracking device 360 detects a change in the position of point of foveation 362, it provides input to the graphics system, which then adjusts the position of foveal region 354 and medial region 352. In some embodiments, parts of some of the regions (e.g., medial region 352) may extend beyond the edge of display device 84. In this example, pixel 370 is now within foveal region 354, while pixels 372 and 374 are now within the peripheral region. Assuming the sample configuration as the example in FIG. 24A, a maximum of 32 samples may contribute to pixel 370, while only one sample will contribute to pixels 372 and 374. Advantageously, this configuration may allocate more samples for regions that are near the point of foveation (i.e., the focal point of the viewer's gaze). This may provide a more realistic image to the viewer without the need to calculate a large number of samples for every pixel on display device 84.

Figure 25A:
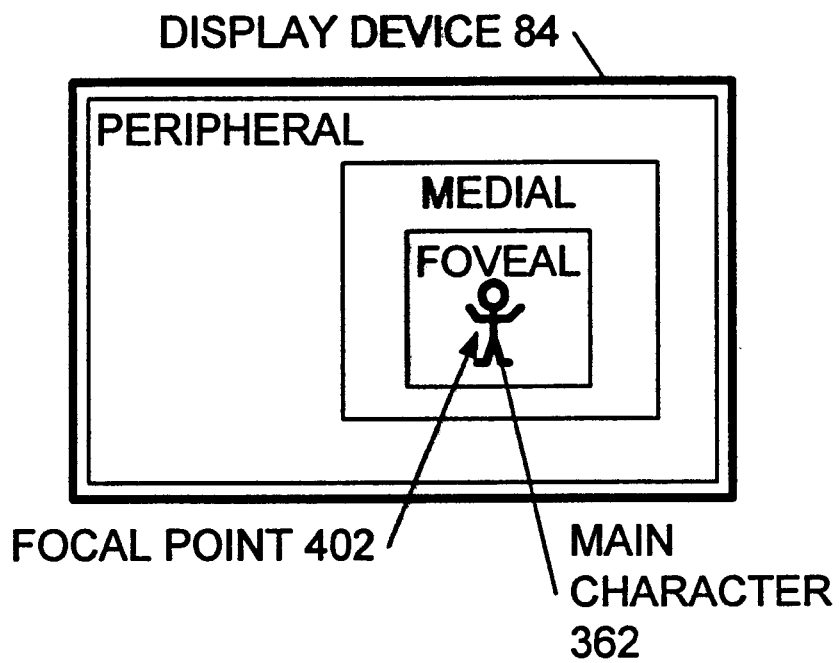
FIGS. 25A–B illustrate details of one embodiment of a method for utilizing eye-tracking to vary the density of samples.
Figure 25B:
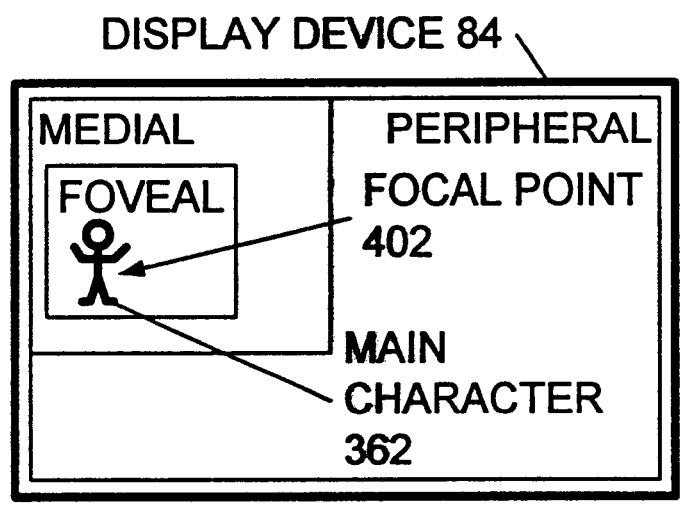

Turning now to FIGS. 25A–B, another embodiment of a computer system configured with a variable resolution super-sampled sample buffer is shown. In this embodiment, the center of the viewer's attention is determined by position of a main character 362. Medial and foveal regions are centered around main character 362 as it moves around the screen. In some embodiments main character may be a simple cursor (e.g., as moved by keyboard input or by a mouse).

In still another embodiment, regions with higher sample density may be centered around the middle of display device 84's screen. Advantageously, this may require less control software and hardware while still providing a shaper image in the center of the screen (where the viewer's attention may be focused the majority of the time).

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:
   one or more processors configured to receive a set of three-dimensional graphics data and render a plurality of samples based on the graphics data;
   a sample buffer configured to store the plurality of samples; and
   a plurality of sample-to-pixel calculation unit, wherein the sample-to-pixel calculation units are configured to receive and filter samples from the sample buffer to create output pixels, wherein the output pixels are usable to form an image on a display device, wherein each of the plurality of sample-to-pixel calculation units are configured to generate pixels corresponding to a different one of a plurality of regions of the image.

2. The graphics system as recited in claim 1, wherein the processors are configured to receive the three-dimensional graphics data in a compressed form, and wherein the processors are configured to decompress the three-dimensional graphics data before rendering the samples.

3. The graphics system as recited in claim 1, wherein each region corresponds to a different vertical stripe of the image.

4. The graphics system as recited in claim 1, wherein each region comprises portions of the image that correspond to one or more odd or even scan lines.

5. The graphics system as recited in claim 1, wherein each region comprises a different quadrant of the image.

6. The graphics system as recited in claim 1, wherein the plurality of regions overlap.

7. The graphics system as recited in claim 1, wherein the display device comprises a plurality of individual display devices, and wherein each region corresponds to a single one of the plurality of individual display devices.

8. The graphics system as recited in claim 1, wherein the display device comprises a plurality of individual display devices, and wherein each region corresponds to a different one of the plurality of individual display devices.

9. The graphics system as recited in claim 1, wherein the regions vary in dimension on a frame-by-frame basis.

10. The graphics system as recited in claim 1, wherein the regions of the image vary in dimension on a frame-by-frame basis to balance the number of samples filtered by each of the sample-to-pixel calculation units.

11. The graphics system as recited in claim 1, wherein each region is a different horizontal stripe of the image.

12. The graphics system as recited in claim 1, wherein each region is a different rectangular portion of the image.

13. The graphics system as recited in claim 1, wherein each sample comprises color components, and wherein the sample-to-pixel calculation units are configured to:
   determine which samples are within a predetermined filter envelope;
   multiply the samples within the predetermined filter envelope by one or more un-normalized weighting factors, wherein the weighting factors vary in relation to the sample's position relative to the center of the filter envelope; and
   normalize the resulting output pixels.

14. The graphics system as recited in claim 1, wherein each sample comprises color components, and wherein the sample-to-pixel calculation units are configured to determine which samples are within a predetermined filter envelope, and multiply the samples within the predetermined filter envelope by one or more normalized weighting factors, wherein the weighting factors vary in relation to the sample's position relative to the center of the filter envelope.

15. The graphics system as recited in claim 1, wherein each sample comprises an alpha component.

16. The graphics system as recited in claim 1, wherein each sample comprises a blur component.

17. The graphics system as recited in claim 1, wherein each sample comprises a transparency component.

18. The graphics system as recited in claim 1, wherein each sample comprises a z-component.

19. The graphics system as recited in claim 1, wherein the samples stored in the sample buffer are double buffered.

20. The graphics system as recited in claim 1, wherein the samples stored in the sample buffer are stored in bins.

21. The graphics system as recited in claim 1, further comprising the display device.

22. A method for rendering a set of three-dimensional graphics data, the method comprising:
   receiving the three-dimensional graphics data;
   generating one or more samples based on the graphics data;
   storing the samples;
   dividing the samples into a plurality of regions;
   selecting stored samples from the plurality of regions; and
   filtering the selected samples to form a plurality of output pixels in parallel, wherein the output pixels are usable to form an image on a display device.

23. The method as recited in claim 22, wherein the plurality of regions comprise portions of one or more odd or even scan lines of the image.

24. The method as recited in claim 22, wherein each region comprises a quadrant of the image.

25. The method as recited in claim 22, wherein each region comprises a vertical stripe of the image.

26. The method as recited in claim 22, wherein each region corresponds to a horizontal stripe of the image.

27. The method as recited in claim 22, wherein the display device comprises a plurality of individual display devices, and wherein each region corresponds to a single one of the plurality of individual display devices.

28. The method as recited in claim 22, wherein the display device comprises a plurality of individual display devices, and wherein each region corresponds to a different one of the plurality of individual display devices.

29. The method as recited in claim 22, wherein each region comprises a vertical stripe of the image.

30. The method as recited in claim 22, wherein the regions of the image overlap.

31. The method as recited in claim 22, wherein the boundaries of the regions change over time to balance the number of samples in each vertical column.

32. The method as recited in claim 22, wherein the number of samples filtered per pixel varies across the image.

33. The method as recited in claim 22, wherein the boundaries of the regions change over time to equalized the number of samples in each region.

34. The method as recited in claim 22, wherein the three-dimensional graphics data is received in compressed form, and wherein the method further comprises: decompressing the compressed three-dimensional graphics data.

35. The method as recited in claim 22, wherein each sample comprises color components, and wherein said filtering comprises:
   determining which samples are within a predetermined filter envelope;
   multiplying the samples within the predetermined filter envelope by one or more un-normalized weighting factors, wherein said weighting factors vary in relation to the sample's position relative to the center of the filter envelope;
   summing the weighted samples to form an output pixel; and
   normalizing the output pixel.

36. The method as recited in claim 22, wherein each sample comprises color components, and wherein said filtering comprises:
   determining which samples are within a predetermined filter envelope;
   multiplying the samples within the predetermined filter envelope by one or more normalized weighting factors, wherein the weighting factors vary in relation to the sample's position relative to the center of the filter envelope; and
   summing the weighted samples to form an output pixel.

37. The method as recited in claim 22, wherein the samples are stored in bins.

38. A computer system comprising:
   a means for receiving a set of three-dimensional graphics data;
   a means for rendering a plurality of samples based on the set of three-dimensional graphics data;
   a means for storing the rendered samples; and
   a plurality of filtering means configured to filter stored samples to create output pixels, wherein the output pixels are usable to form an image on a display device, and wherein each of the plurality of filtering means are configured to generate pixels corresponding to one of a plurality of different regions of the image.

39. The computer system as recited in claim 38, wherein each region corresponds to a different vertical stripe of the image.

40. The computer system as recited in claim 38, wherein the regions overlap.

41. The computer system as recited in claim 38, wherein the regions vary in size over time.

42. The computer system as recited in claim 38, wherein each region varies in size on a frame-by-frame basis to balance the number of samples filtered by each of the filtering means.

43. The computer system as recited in claim 38, wherein each region corresponds to a different horizontal stripe of the image.

44. The computer system as recited in claim 38, wherein each region corresponds to a different rectangular portion of the image.

45. The computer system as recited in claim 38, wherein each region corresponds to a different quadrant of the image.

46. The method as recited in claim 38, wherein one or more of the plurality of regions comprises portions of the image corresponding to one or more odd scan lines of the image, and wherein one or more of the plurality of regions comprises portions of the image corresponding to one or more even scan lines of the image.

47. The computer system as recited in claim 38, wherein the size of each portion of the image varies on a frame-by-frame basis to balance the number of samples filtered by each of the filtering means.

48. The computer system as recited in claim 38, wherein each sample comprises color components, and wherein the filtering means are configured to determine which samples are within a predetermined filter envelope, multiply the samples within the predetermined filter envelope by one or more un-normalized weighting factors, wherein the weighting factors varies in relation to the sample's position relative to the center of the filter envelope, and normalize the resulting output pixels.

49. The computer system as recited in claim 38, wherein each sample comprises color components, and wherein the filtering means are configured to determine which samples are within a predetermined filter envelope, multiply the samples within the predetermined filter envelope by one or more normalized weighting factors to form one or more output pixels.

50. The computer system as recited in claim 38, wherein each sample further comprises an alpha component.

51. The computer system as recited in claim 38, wherein the samples stored in the sample buffer are double buffered.

52. The computer system as recited in claim 38, wherein the samples stored in the sample buffer are stored in bins.

* * * * *